(12) United States Patent
Blumenberg

(10) Patent No.: US 9,836,211 B2
(45) Date of Patent: *Dec. 5, 2017

(54) DEVICE, METHOD, AND GRAPHICAL USER INTERFACE FOR SELECTION OF VIEWS IN A THREE-DIMENSIONAL MAP BASED ON GESTURE INPUTS

(71) Applicant: Apple Inc., Cupertino, CA (US)

(72) Inventor: Chris Blumenberg, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 14/702,547

(22) Filed: May 1, 2015

(65) Prior Publication Data

US 2015/0234589 A1  Aug. 20, 2015

Related U.S. Application Data

(63) Continuation of application No. 13/710,375, filed on Dec. 10, 2012, now Pat. No. 9,026,951.

(Continued)

(51) Int. Cl.
*G06F 3/033* (2013.01)
*G06F 3/0488* (2013.01)
*G06F 17/30* (2006.01)

(52) U.S. Cl.
CPC .... *G06F 3/04883* (2013.01); *G06F 17/30061* (2013.01)

(58) Field of Classification Search
CPC .............. G01C 21/3667; G01C 21/367; G01C 21/3679
See application file for complete search history.

(56) References Cited

U.S. PATENT DOCUMENTS 6,901,561 B1  5/2005  Kirkpatrick et al.
7,567,844 B2  7/2009  Thomas et al.
(Continued)

FOREIGN PATENT DOCUMENTS

CN     1995917 A     7/2007
CN   102187309 A     9/2011
(Continued)

OTHER PUBLICATIONS

Non-Final Office Action received for U.S. Appl. No. 13/710,375, mailed on Jul. 18, 2014, 8 pages.
(Continued)

*Primary Examiner* — Omar Abdul-Ali
(74) *Attorney, Agent, or Firm* — Dentons US LLP

(57) ABSTRACT

An electronic device displays a first map view of a map that includes one or more map objects on a touch-sensitive display. While displaying the first map view, the device detects a first gesture of a first gesture type at a first location on the touch-sensitive display. The first location corresponds to a respective map object. In response to detecting the first gesture at the first location, the device enters a map view selection mode. While in the map view selection mode, the device detects a second gesture of a second gesture type at a second location on the touch-sensitive display. The second location corresponds to a respective location on the map. In response to detecting the second gesture at the second location, the device replaces the first map view with a second map view that includes a view of the respective map object from the respective location.

51 Claims, 18 Drawing Sheets

Related U.S. Application Data

(60) Provisional application No. 61/578,822, filed on Dec. 21, 2011.

(56) References Cited

U.S. PATENT DOCUMENTS

| | | | |
|---|---|---|---|
| 8,487,957 | B1 | 7/2013 | Bailly et al. |
| 8,624,797 | B2 | 1/2014 | Lee et al. |
| 9,026,951 | B2 | 5/2015 | Blumenberg |
| 2001/0048423 | A1 | 12/2001 | Rekimoto |
| 2003/0025812 | A1 | 2/2003 | Slatter et al. |
| 2004/0236507 | A1 | 11/2004 | Maruyama et al. |
| 2006/0170791 | A1 | 8/2006 | Porter et al. |
| 2007/0219645 | A1 | 9/2007 | Thomas et al. |
| 2009/0082960 | A1* | 3/2009 | Ramaswamy ..... G01C 21/3635 701/431 |
| 2009/0167702 | A1 | 7/2009 | Nurmi |
| 2009/0167890 | A1 | 7/2009 | Nakagomi et al. |
| 2010/0005390 | A1 | 1/2010 | Bong |
| 2010/0020222 | A1 | 1/2010 | Jones et al. |
| 2010/0045666 | A1 | 2/2010 | Kornmann et al. |
| 2010/0053219 | A1 | 3/2010 | Kornmann |
| 2010/0136957 | A1 | 6/2010 | Horodezky et al. |
| 2010/0141786 | A1 | 6/2010 | Bigioi et al. |
| 2011/0069018 | A1 | 3/2011 | Atkins et al. |
| 2011/0080359 | A1 | 4/2011 | Jang et al. |
| 2011/0090155 | A1 | 4/2011 | Caskey et al. |
| 2011/0141141 | A1 | 6/2011 | Kankainen |
| 2011/0161076 | A1 | 6/2011 | Davis et al. |
| 2011/0164163 | A1 | 7/2011 | Bilbrey et al. |
| 2011/0258537 | A1 | 10/2011 | Rives et al. |
| 2012/0106790 | A1 | 5/2012 | Sultana et al. |
| 2012/0162225 | A1* | 6/2012 | Yang ................ G06F 17/30241 345/420 |
| 2012/0223936 | A1 | 9/2012 | Aughey et al. |
| 2012/0316782 | A1 | 12/2012 | Sartipi et al. |
| 2013/0063488 | A1 | 3/2013 | Gaebler et al. |
| 2013/0162534 | A1 | 6/2013 | Chen et al. |

FOREIGN PATENT DOCUMENTS

| | | |
|---|---|---|
| EP | 1369822 A2 | 12/2003 |
| EP | 1926075 A2 | 5/2008 |
| EP | 2385500 A2 | 11/2011 |
| WO | 2010/114878 A1 | 10/2010 |

OTHER PUBLICATIONS

Notice of Allowance received for U.S. Appl. No. 13/710,375, mailed on Jan. 7, 2015, 7 pages.
Wikipedia, "Google Earth", Wikipedia, The Free Encyclopedia, available at "http://en.wikipedia.org/wiki/Google_Earth", Last modified on Feb. 4, 2014, 14 pages.
Notice of Allowance received for U.S. Appl. No. 12/764,360, mailed on Oct. 1, 2012, 13 pages.
Non-Final Office Action received for U.S. Appl. No. 13/536,677, mailed on Apr. 3, 2014, 10 pages.
Non-Final Office Action received for U.S. Appl. No. 13/536,677, mailed on Nov. 3, 2014, 10 pages.
Office Action received for Chinese Patent Application No. 201210435870.2, mailed on May 29, 2015, 12 pages (4 pages of Official Copy and 8 pages of English Translation).
Extended European Search Report (includes Partial European Search Report and European Search Opinion) received for European Patent Application No. 12187992.8, mailed on Jul. 6, 2015, 5 pages.
Notice of Allowance received for U.S. Appl. No. 13/536,677, mailed on Aug. 5, 2015, 5 pages.
Office Action received for Chinese Patent Application No. 201210563026.8, mailed on May 26, 2015, 27 pages. (16 pages of English Translation and 11 pages of Official Copy).
Notice of Allowance received for U.S. Appl. No. 13/536,677, mailed on Aug. 19, 2015, 2 pages.
Notice of Allowance received for U.S. Appl. No. 13/536,677, mailed on Sep. 4, 2015, 2 pages.
Office Action received for Chinese Patent Application No. 201210563026.8, mailed on Dec. 29, 2015, 6 pages (3 pages of English Translation and 3 pages of Official Copy).
Office Action received for Chinese Patent Application No. 201210435870.2, mailed on Feb. 16, 2016, 15 pages (9 pages of English Translation and 6 pages of Official Copy).
European Search Report received for European Patent Application No. 12198284.7, mailed on Jan. 19, 2016, 13 pages.
Notice of Allowance received for Chinese Patent Application No. 201210563026.8, issued on May 12, 2016, 4 pages (2 pages of English Translation and 2 pages of Official copy).
Intention to Grant received for European Patent Application No. 12198284.7, mailed on Jan. 20, 2017, 7 pages.
Office Action received for Chinese Patent Application No. 201210435870.2, mailed on Dec. 30, 2016, 8 pages (2 pages of English Translation and 6 pages of Official Copy).
Office Action received for European Patent Application No. 12187992.8, mailed on Mar. 15, 2017, 7 pages.
Decision to Grant received for European Patent Application No. 12198284.7, dated Jun. 9, 2017, 2 pages.

* cited by examiner

DEVICE, METHOD, AND GRAPHICAL USER INTERFACE FOR SELECTION OF VIEWS IN A THREE-DIMENSIONAL MAP BASED ON GESTURE INPUTS

RELATED APPLICATIONS

This application is a continuation of U.S. patent application Ser. No. 13/710,375, filed Dec. 10, 2012, now U.S. Pat. No. 9,026,951, issued on May 5, 2015, which claims priority to U.S. Provisional Patent Application No. 61/578,822, filed Dec. 21, 2011, which are incorporated herein by reference in their entirety.

TECHNICAL FIELD

This relates generally to electronic devices with touch-sensitive surfaces, including but not limited to electronic devices with touch-sensitive surfaces and displays that display three-dimensional maps.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interfaces on a display.

Existing methods for manipulating user interfaces containing three-dimensional maps are cumbersome and inefficient. For example, using a sequence of mouse-based inputs or keyboard-based inputs to move, rotate, tilt, zoom and otherwise adjust a three-dimensional map view is tedious and creates a significant cognitive burden on a user. In addition, existing methods take longer than necessary, thereby wasting energy. This latter consideration is particularly important in battery-operated devices.

SUMMARY

Accordingly, there is a need for electronic devices with faster, more efficient methods and interfaces for selecting views in a three-dimensional map. Such methods and interfaces may complement or replace conventional methods for manipulating such views. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer or a gaming computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, in addition to manipulating three-dimensional maps, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a touch-sensitive display. The method includes: displaying on the touch-sensitive display a first map view of a map that includes one or more map objects; and, while displaying the first map view, detecting a first gesture of a first gesture type at a first location on the touch-sensitive display, wherein the first location corresponds to a respective map object of the one or more map objects. The method also includes, in response to detecting the first gesture of the first gesture type at the first location on the touch-sensitive display, entering a map view selection mode. The method further includes, while in the map view selection mode, detecting a second gesture of a second gesture type at a second location on the touch-sensitive display distinct from the first location, wherein the second location corresponds to a respective location on the map. The method also includes, in response to detecting the second gesture at the second location on the touch-sensitive display, replacing the first map view with a second map view, wherein the second map view includes a view of the respective map object from the respective location on the map.

In accordance with some embodiments, an electronic device includes a touch-sensitive display, one or more processors, and memory storing one or more programs. The one or more programs are configured to be executed by the one or more processors. The one or more programs include instructions for: displaying on the touch-sensitive display a first map view of a map that includes one or more map objects; and, while displaying the first map view, detecting a first gesture of a first gesture type at a first location on the touch-sensitive display, wherein the first location corresponds to a respective map object of the one or more map objects. The one or more programs also include instructions for, in response to detecting the first gesture of the first gesture type at the first location on the touch-sensitive display, entering a map view selection mode. The one or more programs further include instructions for, while in the map view selection mode, detecting a second gesture of a second gesture type at a second location on the touch-sensitive display distinct from the first location, wherein the second location corresponds to a respective location on the map. The one or more programs also include instructions for, in response to detecting the second gesture at the second location on the touch-sensitive display, replacing the first map view with a second map view, wherein the second map view includes a view of the respective map object from the respective location on the map.

In accordance with some embodiments, a computer readable storage medium has stored therein instructions, which, when executed by an electronic device with a touch-sensitive display, cause the device to: display on the touch-sensitive display a first map view of a map that includes one or more map objects; and, while displaying the first map view, detect a first gesture of a first gesture type at a first location on the touch-sensitive display, wherein the first location corresponds to a respective map object of the one or more map objects. The instructions also cause the device to, in response to detecting the first gesture of the first gesture type at the first location on the touch-sensitive display, enter a map view selection mode. The instructions further cause the device to, while in the map view selection mode, detect a second gesture of a second gesture type at a second location on the touch-sensitive display distinct from the first location, wherein the second location corresponds to a respective location on the map. The instructions also cause the device to, in response to detecting the second gesture at the second location on the touch-sensitive display, replace the first map view with a second map view, wherein the second map view includes a view of the respective map object from the respective location on the map.

In accordance with some embodiments, a graphical user interface on an electronic device with a touch-sensitive display, a memory, and one or more processors to execute one or more programs stored in the memory includes a first map view of a map that includes one or more map objects. While displaying the first map view, a first gesture of a first gesture type is detected at a first location on the touch-sensitive display, wherein the first location corresponds to a respective map object of the one or more map objects. In response to detecting the first gesture of the first gesture type at the first location on the touch-sensitive display, a map view selection mode is entered. While in the map view selection mode, in response to detecting a second gesture of a second gesture type at a second location on the touch-sensitive display distinct from the first location, wherein the second location corresponds to a respective location on the map, the first map view is replaced with a second map view, wherein the second map view includes a view of the respective map object from the respective location on the map.

In accordance with some embodiments, an electronic device includes: a touch-sensitive display; means for displaying on the touch-sensitive display a first map view of a map that includes one or more map objects; and means, enabled while displaying the first map view, for detecting a first gesture of a first gesture type at a first location on the touch-sensitive display, wherein the first location corresponds to a respective map object of the one or more map objects. The electronic device also includes means, enabled in response to detecting the first gesture of the first gesture type at the first location on the touch-sensitive display, for entering a map view selection mode. The electronic device further includes means, enabled while in the map view selection mode, including means for detecting a second gesture of a second gesture type at a second location on the touch-sensitive display distinct from the first location, wherein the second location corresponds to a respective location on the map. The electronic device also includes means, enabled in response to detecting the second gesture at the second location on the touch-sensitive display, for replacing the first map view with a second map view, wherein the second map view includes a view of the respective map object from the respective location on the map.

In accordance with some embodiments, an information processing apparatus for use in an electronic device with a touch-sensitive display includes: means for displaying on the touch-sensitive display a first map view of a map that includes one or more map objects; and means, enabled while displaying the first map view, for detecting a first gesture of a first gesture type at a first location on the touch-sensitive display, wherein the first location corresponds to a respective map object of the one or more map objects. The information processing apparatus also includes means, enabled in response to detecting the first gesture of the first gesture type at the first location on the touch-sensitive display, for entering a map view selection mode. The information processing apparatus further includes means, enabled while in the map view selection mode, including means for detecting a second gesture of a second gesture type at a second location on the touch-sensitive display distinct from the first location, wherein the second location corresponds to a respective location on the map. The information processing apparatus also includes means, enabled in response to detecting the second gesture at the second location on the touch-sensitive display, for replacing the first map view with a second map view, wherein the second map view includes a view of the respective map object from the respective location on the map.

In accordance with some embodiments, an electronic device includes a touch-sensitive display unit and a processing unit coupled to the touch-sensitive display unit. The touch-sensitive display unit is configured to display a first map view of a map that includes one or more map objects, and, while displaying the first map view, receive a first gesture of a first gesture type at a first location on the touch-sensitive display unit, wherein the first location corresponds to a respective map object of the one or more map objects. The processing unit is configured to, in response to detecting the first gesture of the first gesture type at the first location on the touch-sensitive display unit, enter a map view selection mode. The processing unit is also configured to, while in the map view selection mode, detect a second gesture of a second gesture type at a second location on the touch-sensitive display unit distinct from the first location, wherein the second location corresponds to a respective location on the map. The processing unit is further configured to, in response to detecting the second gesture at the second location on the touch-sensitive display unit, replace the first map view with a second map view, wherein the second map view includes a view of the respective map object from the respective location on the map.

Thus, electronic devices with touch-sensitive displays are provided with faster, more efficient methods and interfaces for selecting map views using gesture inputs, thereby increasing the effectiveness, efficiency, and user satisfaction with such devices. Such methods and interfaces may complement or replace conventional methods for manipulating map views.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
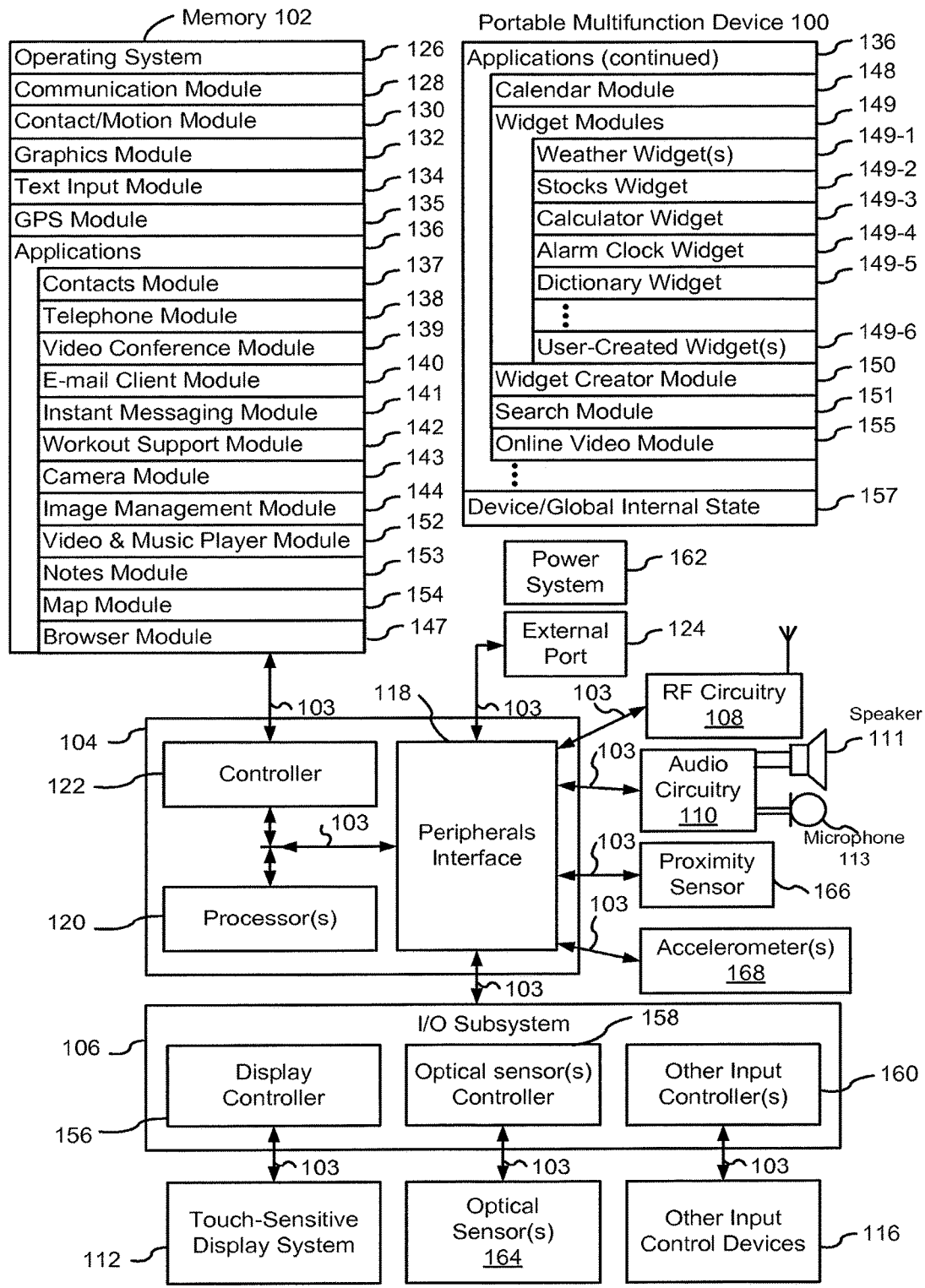
FIG. 1A is a block diagram illustrating a portable multifunction device with a touch-sensitive display in accordance with some embodiments.

Many electronic devices have graphical user interfaces that can be used to display three-dimensional maps. Three-dimensional maps are useful for conveying map information that is not included in two-dimensional maps, such as heights of map objects (e.g., buildings) and side views of map objects. Selecting a view on a three-dimensional map typically requires a user to select multiple variables, for example, three location variables (e.g., a longitude, a latitude, and an altitude) representing a location of a viewpoint (e.g., a location of a virtual viewer or camera) and three orientation variables (e.g., yaw, roll, and pitch angles) representing a direction of the virtual viewer or camera. The selected view corresponds to a view seen from the viewpoint by the virtual viewer or camera in the direction of the virtual viewer or camera. Existing methods for selecting a view on a three-dimensional map typically require a sequence of user inputs for navigating the three-dimensional map. For example, with existing methods, a user typically needs to move the viewpoint with a series of user inputs (e.g., a series of key strokes on a keyboard to move the viewpoint longitudinally and latitudinally, followed by an altitudinal movement). Thereafter, the user often needs to provide additional user inputs to adjust the direction of the virtual viewer or camera (e.g., with repeated key strokes to rotate the virtual viewer or camera). In some cases, the user may need to repeat moving the viewpoint and rotating the virtual viewer or camera until a desired view is selected. In the embodiments described below, an improved method for selecting a view is achieved by displaying a first map view of a map that includes one or more map objects. A particular map object at a first location is selected by detecting a first gesture on the particular map object. In response to detecting the first gesture, the device enters a map view selection mode. In the map view selection mode, detecting a second gesture at a second location (e.g., a viewpoint) on the map immediately replaces the first map view with a second map view, wherein the second map view includes a view of the particular map object from the second location (e.g., the viewpoint) on the map. This method streamlines the map view selection by requiring just two user inputs, thereby eliminating the need for extra, separate steps to select a view in a three-dimensional map.

Below, FIGS. 1A-1B, 2, and 3 provide a description of exemplary devices. FIGS. 4A-4B and 5A-5I illustrate exemplary user interfaces for selecting a view in a three-dimensional map. FIGS. 6A-6B are flow diagrams illustrating a method of selecting a view in a three-dimensional map. The user interfaces in FIGS. 5A-5I are used to illustrate the processes in FIGS. 6A-6B.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention. The first gesture and the second gesture are both gesture, but they are not the same gesture.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).). In some embodiments, the device is a gaming computer.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for video-conferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
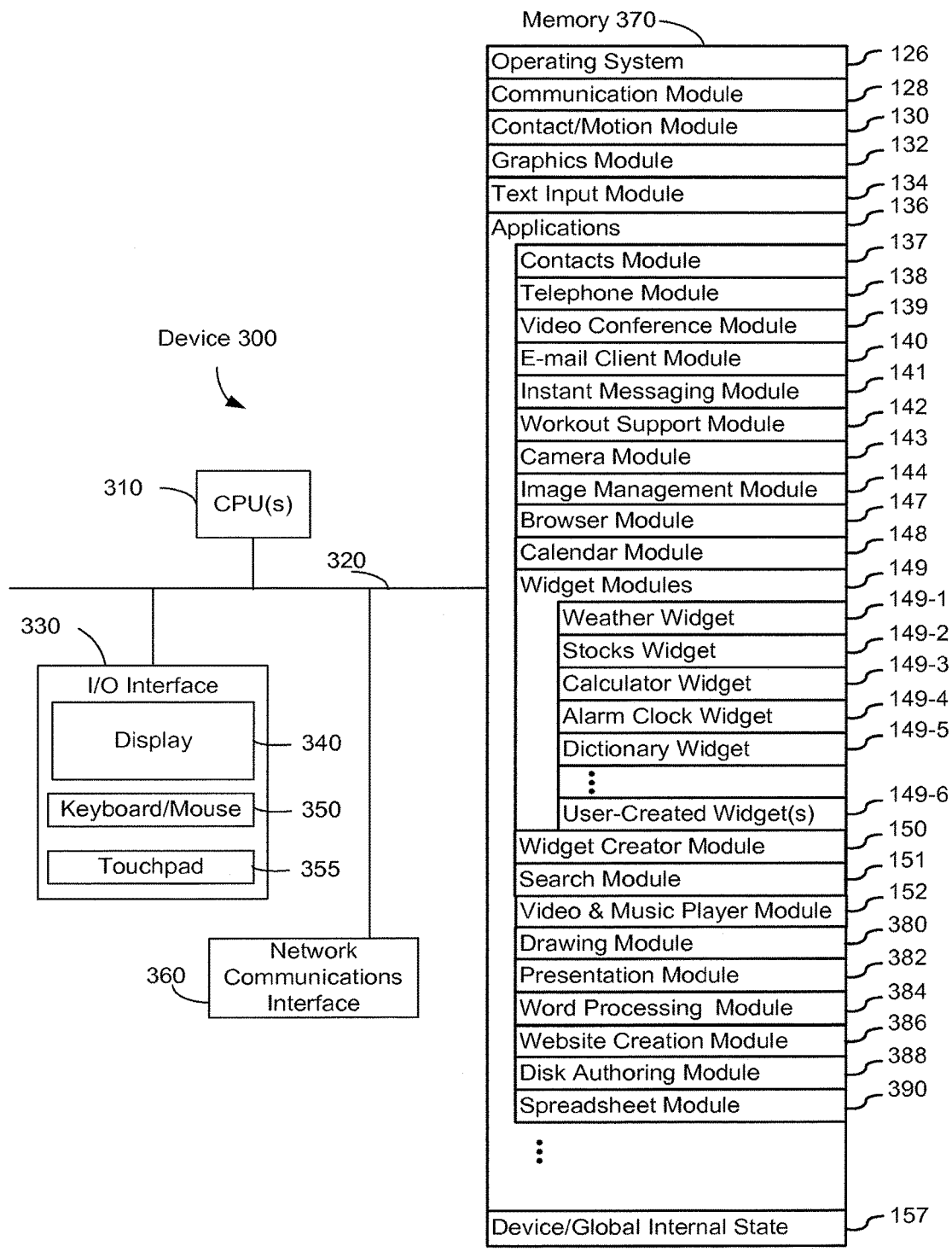
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a mam, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
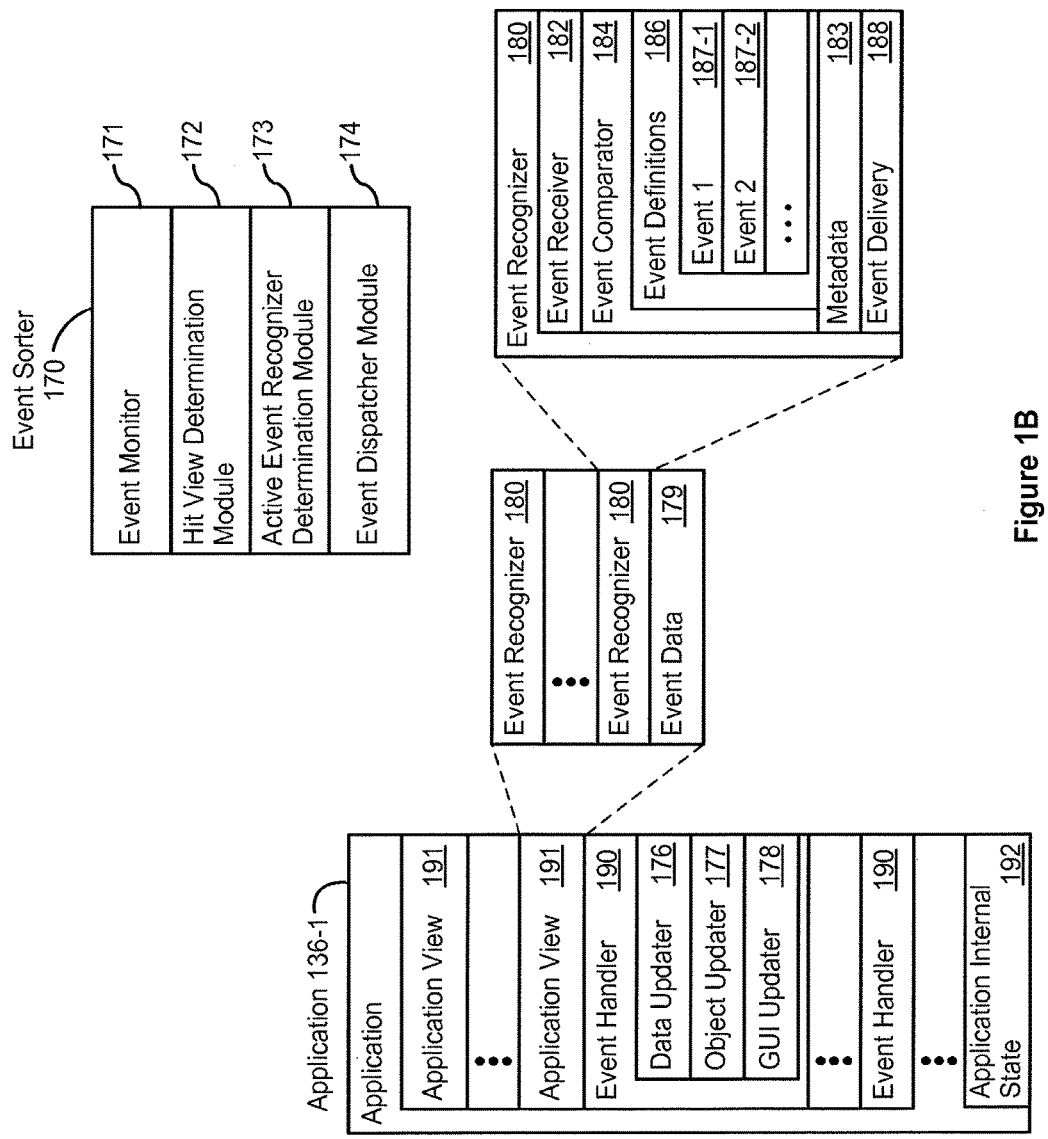
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture. (For clarity, an application view or user interface window may contain a map view (a view of a map from a given perspective), but an application view is distinct from a map view.)

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
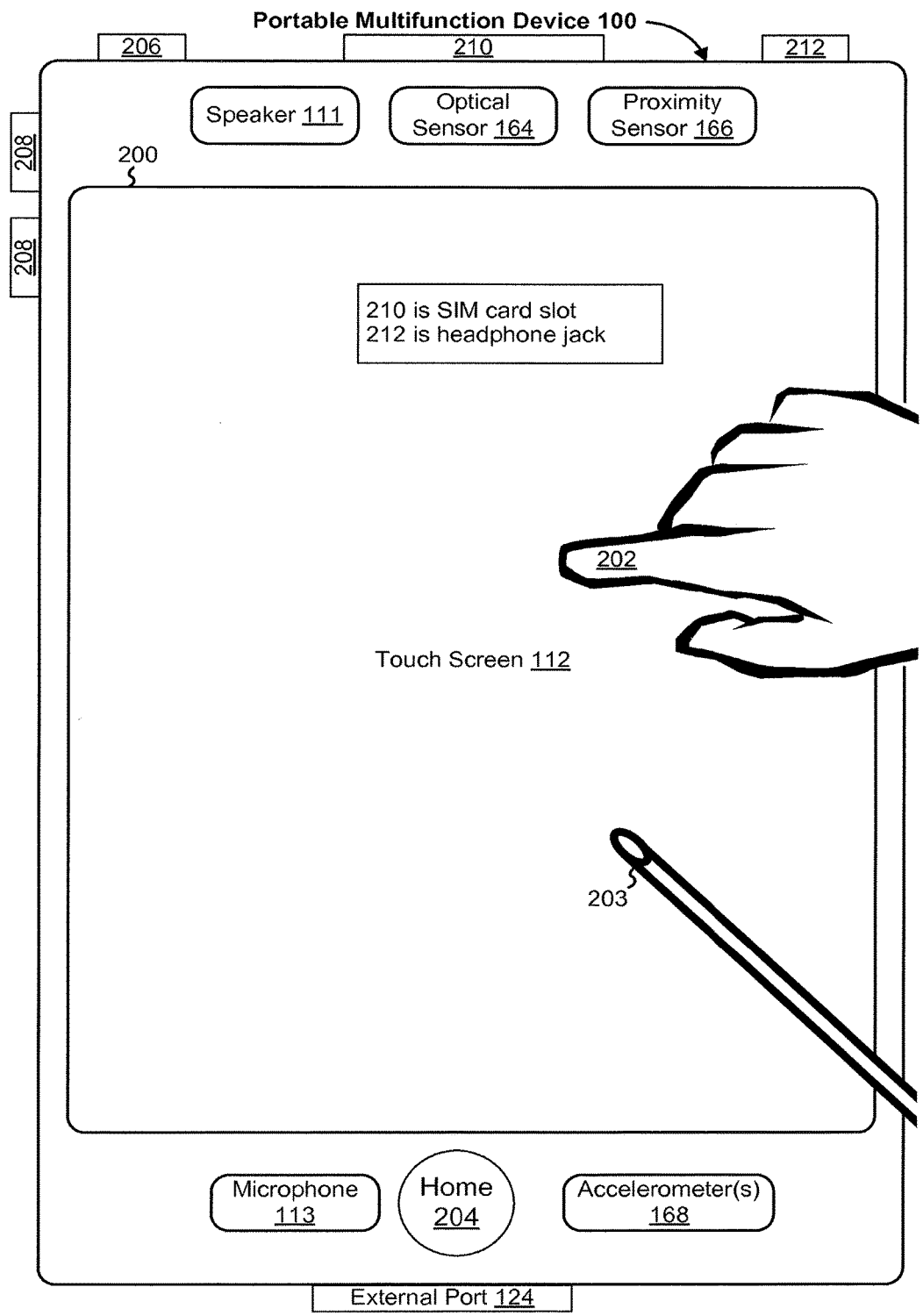
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DOR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
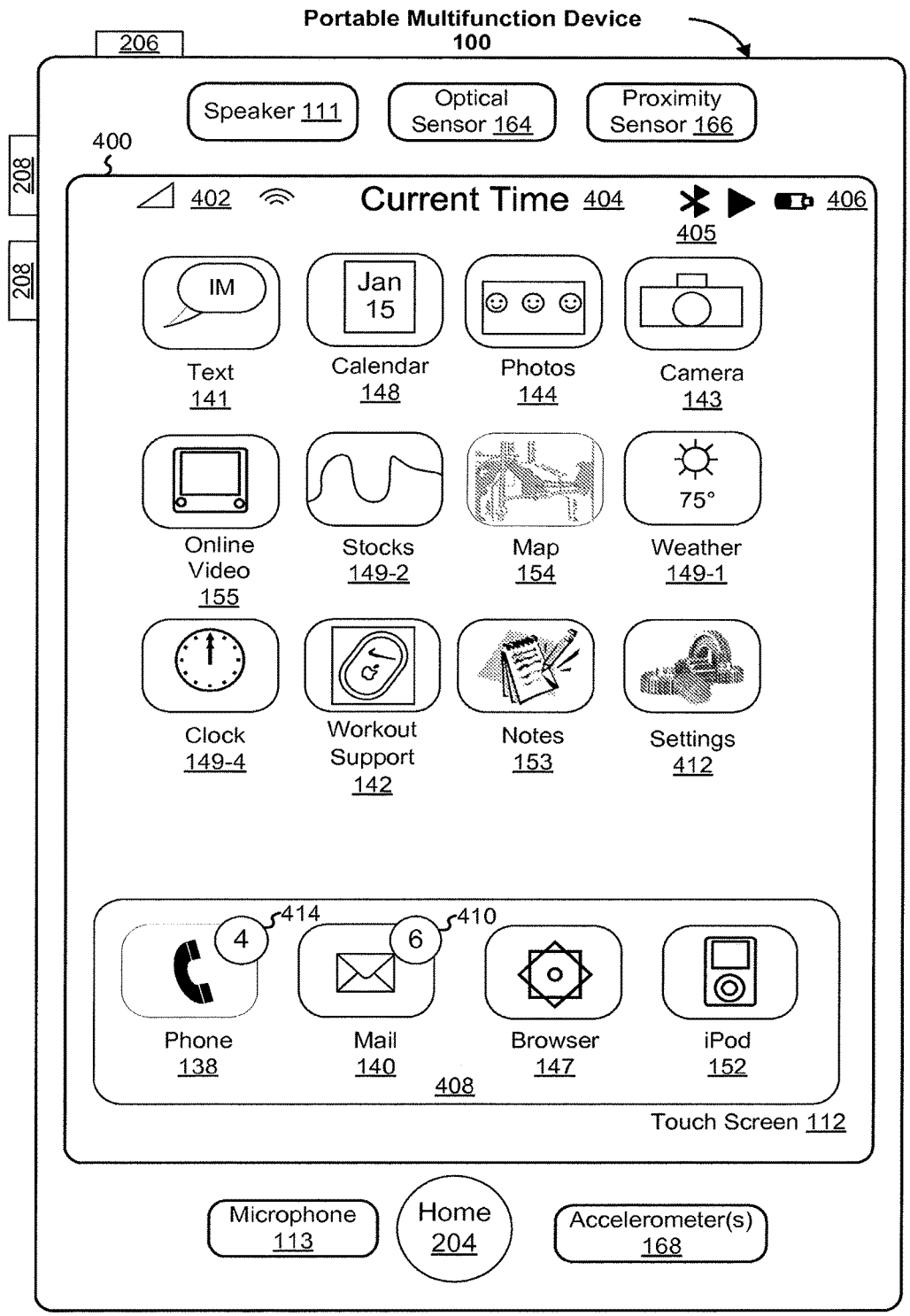
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and
Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;
  Notes 153;
  Settings 412, which provides access to settings for device 100 and its various applications 136; and
  Online video module 155, also referred to as YouTube (trademark of Google Inc.) module 155.

Figure 4B:
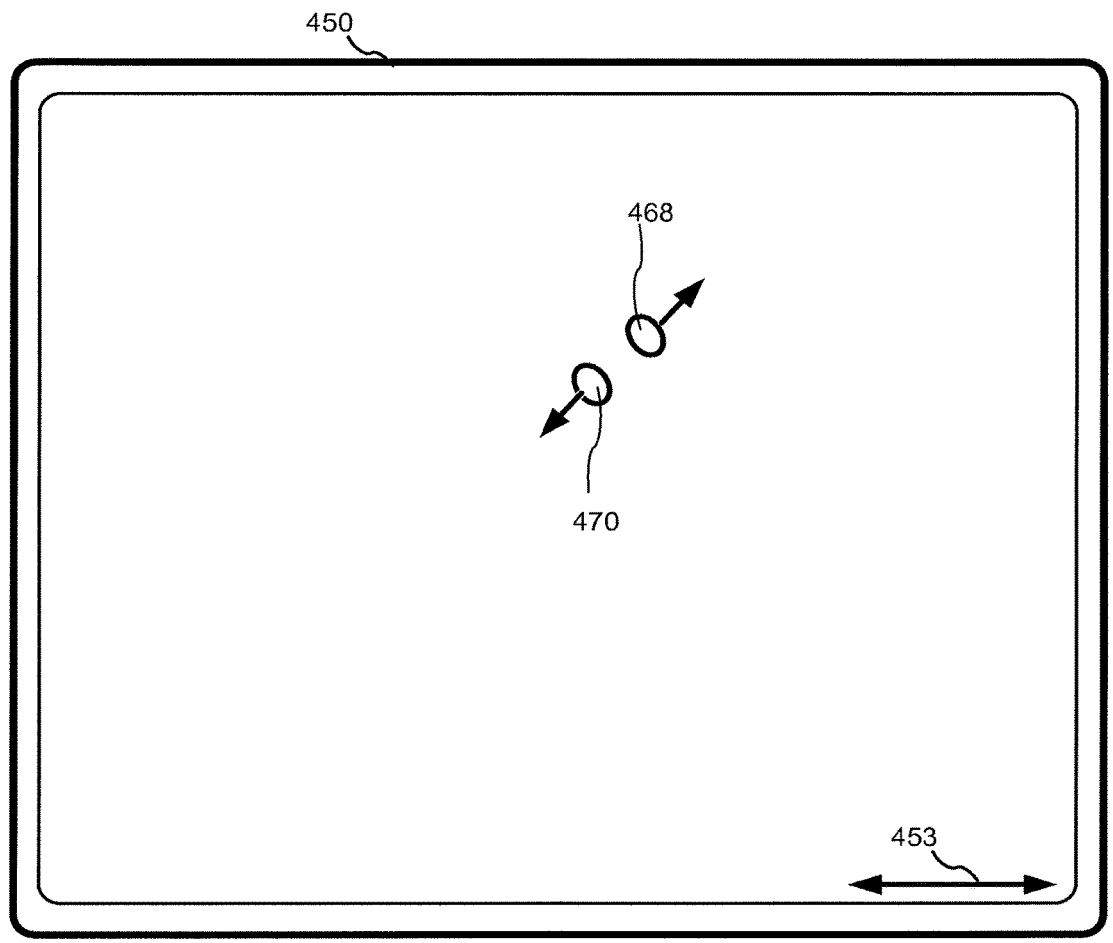
FIG. 4B illustrates an exemplary user interface for a multifunction device with a touch-sensitive surface that is separate from the display in accordance with some embodiments.
Figure 4B:
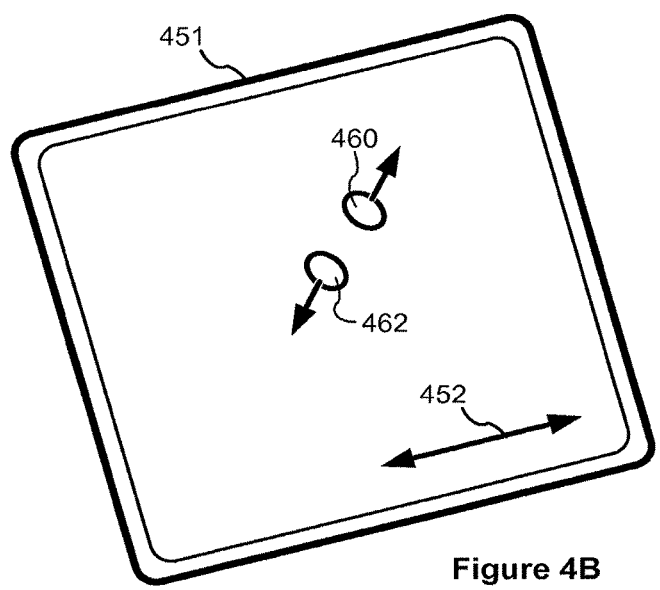

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5G illustrate exemplary user interfaces for selecting a view in a three-dimensional map in accordance with some embodiments. The user interfaces in these figures are used to illustrate the processes described below, including the processes in FIGS. 6A-6B.

Figure 5A:
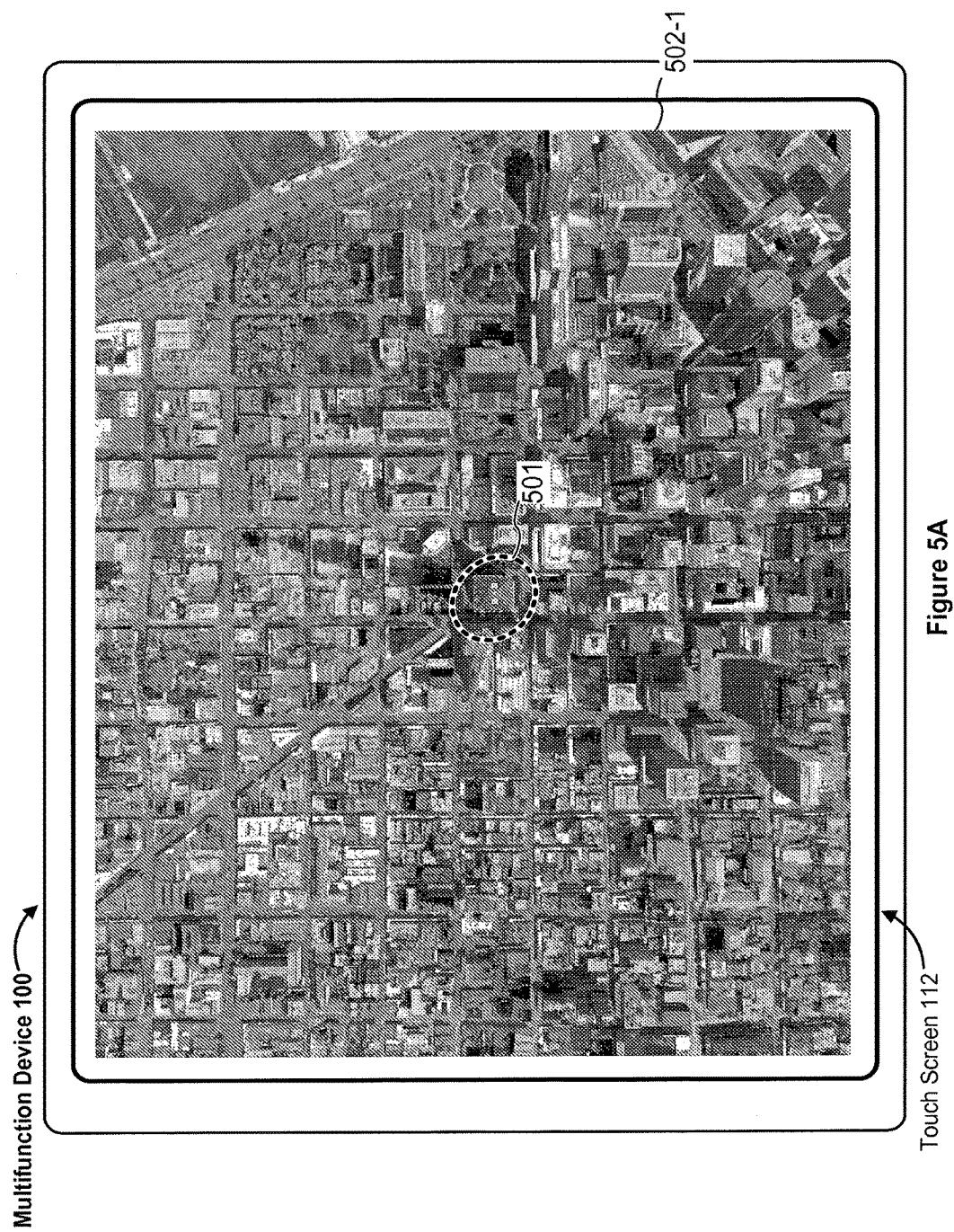
FIGS. 5A-5I illustrate exemplary user interfaces for selecting a view in a three-dimensional map in accordance with some embodiments.
Figure 6A:
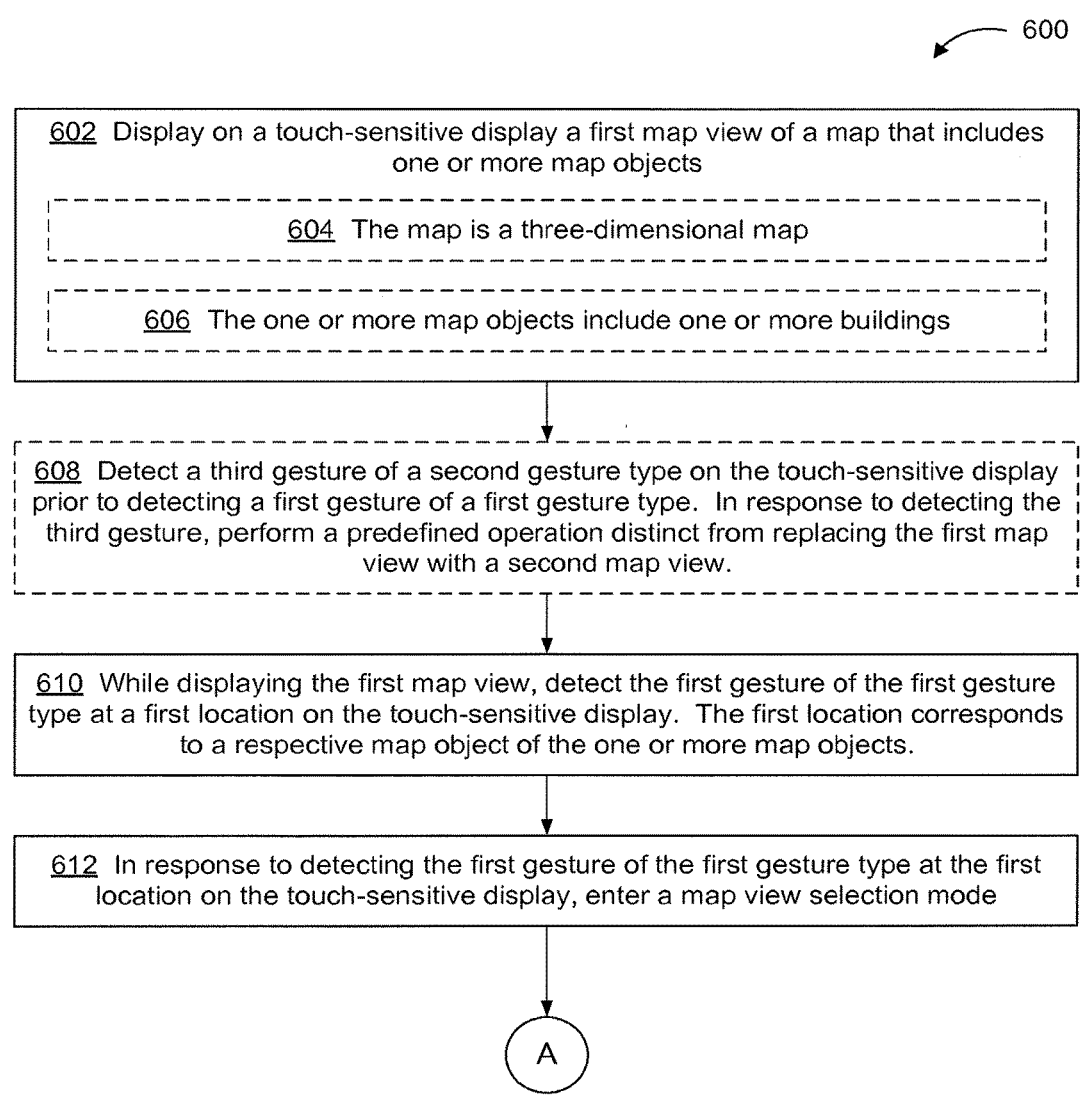
FIGS. 6A-6B are flow diagrams illustrating a method of selecting a view in a three-dimensional map in accordance with some embodiments.
Figure 6B:
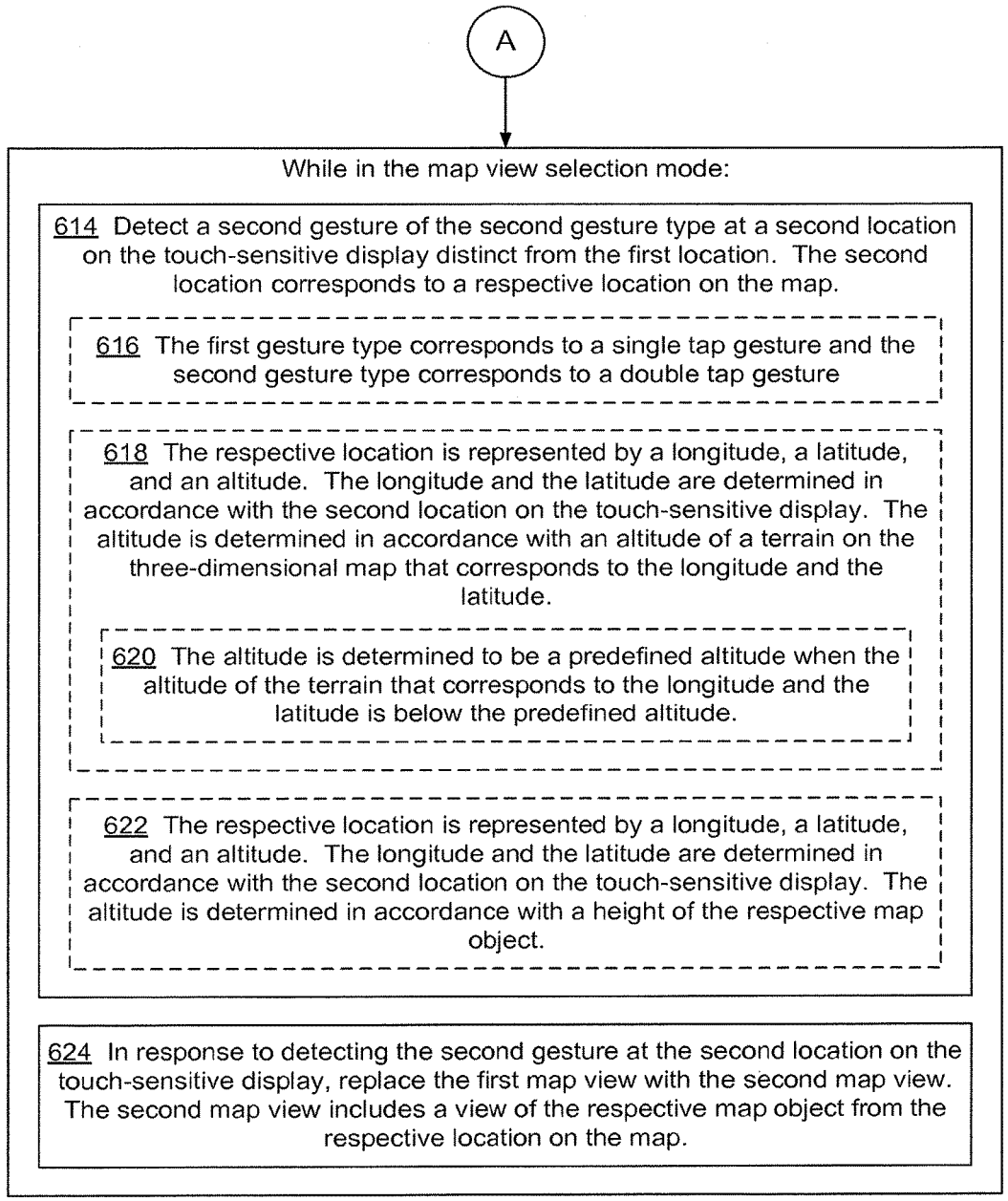

FIG. 5A illustrates user interface 502-1 displayed on touch screen 112 of device 100. User interface 502-1 includes a map of an urban area. In particular, user interface 502-1 includes an aerial view of buildings in the urban area. FIG. 5A also illustrates that touch gesture 501 (e.g., a single-finger double tap gesture) is detected at a location on touch screen 112, which initiates a zoom-in operation. Alternatively, a user may provide a different predefined touch gesture (e.g., a depinch gesture) on touch screen 112 to zoom into a particular region of the map.

Figure 5B:
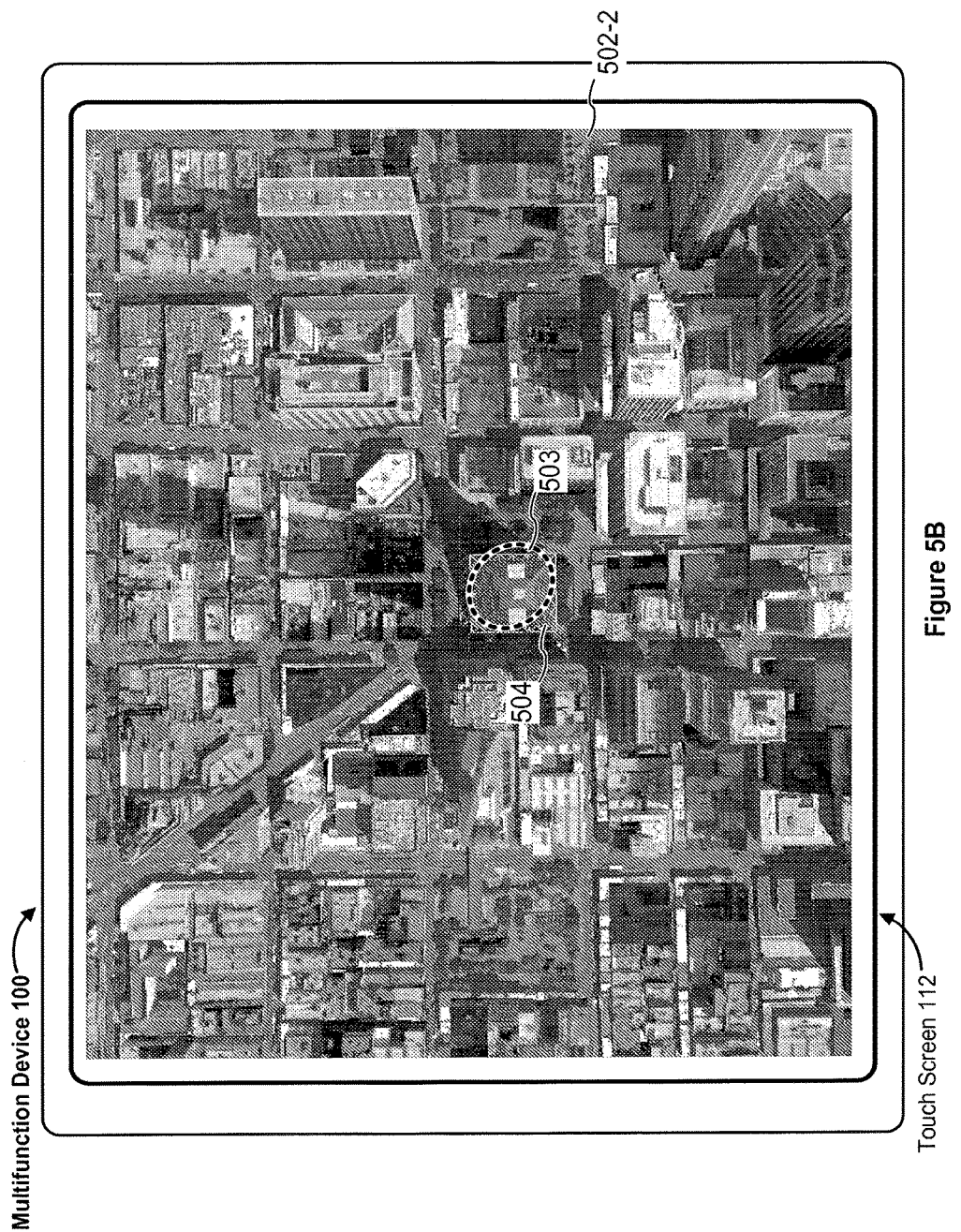

User interface 502-2 shown in FIG. 5B is an exemplary zoomed-in view of the map shown in user interface 502-1 (FIG. 5A). FIG. 5B also shows that touch gesture 503 (e.g., a single-finger single tap gesture) is detected at a location on touch screen 112 that corresponds to building 504 shown on the map. In response to detecting touch gesture 503, building 504 is selected as a target map object. In some embodiments, map views displayed after building 504 is selected as the target map object correspond to views of building 504 (e.g., the map views shown in FIGS. 5D-5I show building 504). In some embodiments, in response to detecting touch gesture 503, multifunction device 100 enters a map view selection mode, and map views displayed while multifunction device 100 is in the map view selection mode are views of the target map object, building 504.

In some embodiments, in response to detecting touch gesture 503, building 504 is visually distinguished to indicate that the device is in the map view selection mode and building 504 is the target map object that the selected view will point toward. For example, an outline may be displayed around building 504 as shown in user interface 502-3 of FIG. 5C. Alternatively, building 504 may be highlighted, the color of building 504 may change, and/or one or more symbols may be displayed over, or adjacent to, building 504.

Figure 5C:
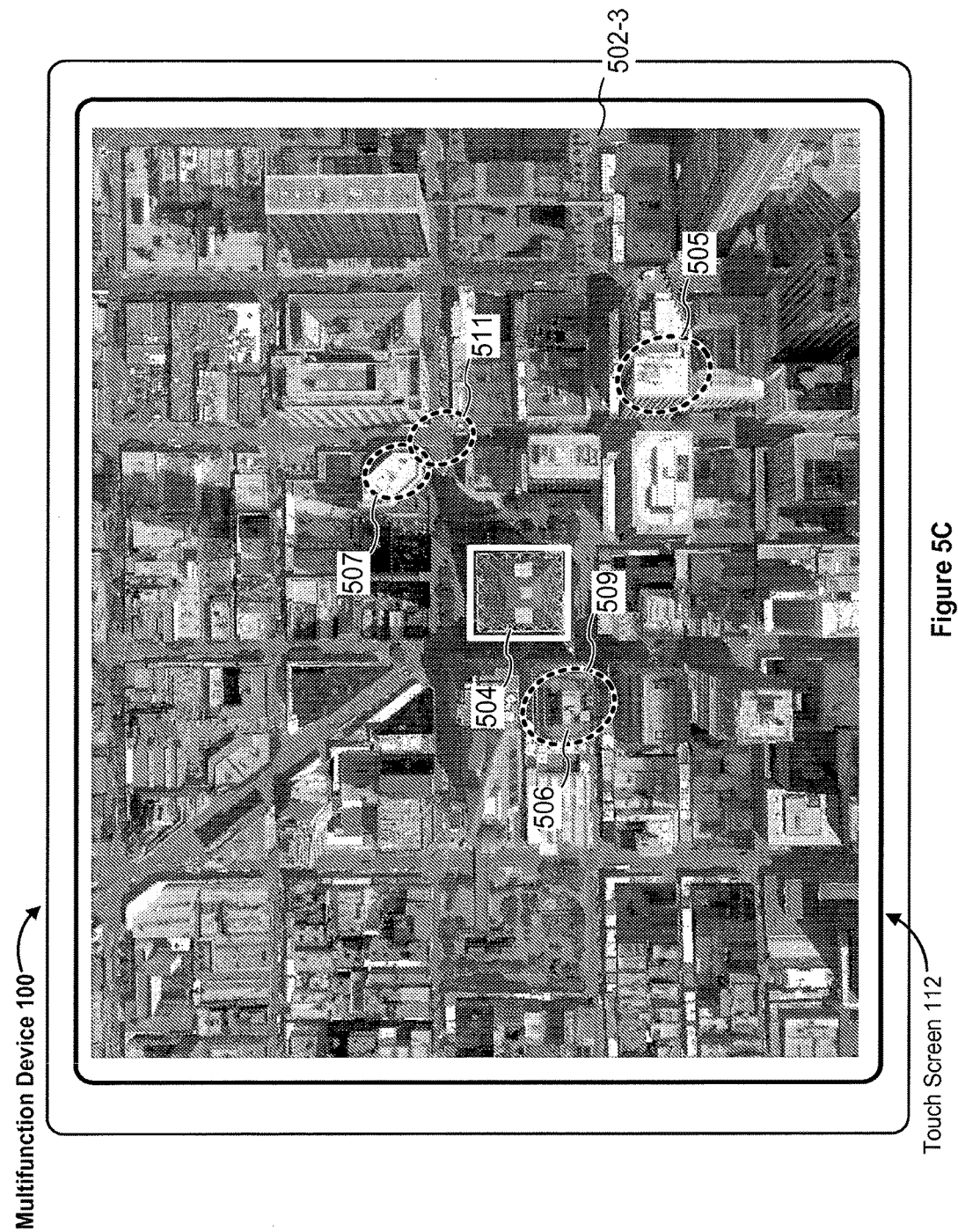

FIG. 5C also shows exemplary touch gestures 505, 507, 509, and 511 (e.g., single-finger double-tap gestures) at multiple locations on touch screen 112 that correspond to respective locations on the map. The respective locations on the map that correspond to respective touch gestures are selected as viewpoints (i.e., the locations of a virtual viewer or camera). Typically, touch gestures 505, 507, 509, and 511 are of a different gesture type compared to that of touch gesture 503. For example, touch gesture 503 may be a single-finger single-tap gesture, and touch gestures 505, 507, 509 and 511 may be single-finger double-tap gestures. It should be noted that touch gestures 505, 507, 509, and 511 are illustrated as alternative gesture inputs, and the operations described herein require neither simultaneous nor sequential detection of touch gestures 505, 507, 509, and 511. For example, after building 504 is selected as the target map object: touch gesture 505 initiates display of user interface 502-4 illustrated in FIG. 5D, touch gesture 507 initiates display of user interface 502-5 illustrated in FIG. 5E, touch gesture 509 on building 506 initiates display of user interface 502-6 illustrated in FIG. 5F, and touch gesture 511 initiates display of one of user interface 502-7, 502-8, and 502-9 illustrated in FIGS. 5G, 5H, and 5I, respectively.

FIG. 5C illustrates touch gestures 505, 507, 509, and 511 detected on a top-down view of the three-dimensional map. However, touch gestures need not be detected on a top-down view of a three-dimensional map. Although not depicted, respective locations on the map may be determined, in an analogous manner, in accordance with touch gestures detected on an oblique view of the three-dimensional map. For example, the longitude and the latitude of a viewpoint are the longitude and the latitude of a location on the map that corresponds to the touch gesture detected on touch screen 112 over an oblique view of a three-dimensional map. Such details for determining a location selected on an oblique map view by a user input are known to a person having ordinary skill in the art, and thus, are omitted for brevity.

Figure 5D:
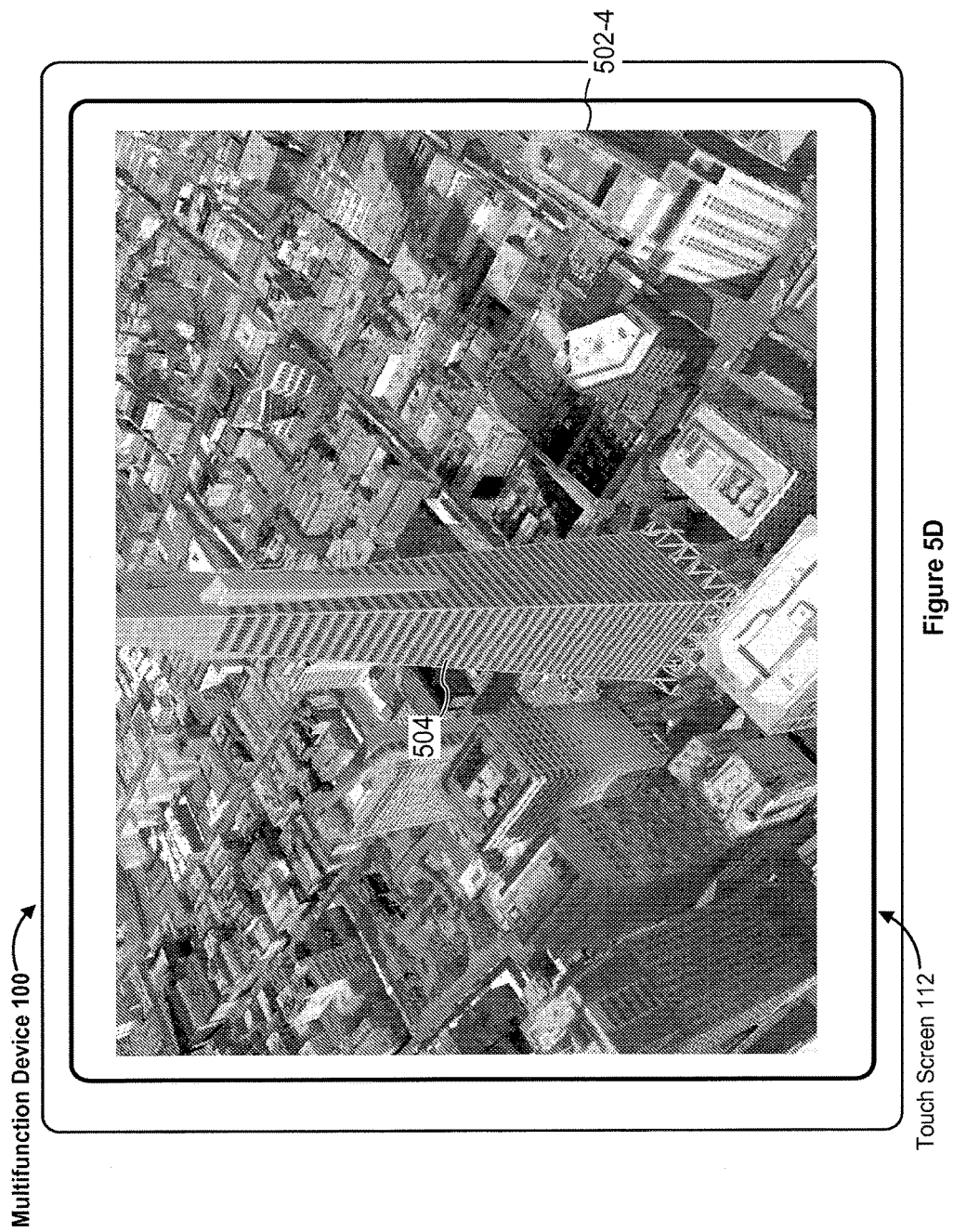

FIG. 5D illustrates exemplary user interface 502-4 displayed in response to detecting touch gesture 505 (FIG. 5C) on touch screen 112. User interface 502-4 shows a view of building 504 from a respective location that corresponds to touch gesture 505 (FIG. 5C). In some embodiments, the longitude and the latitude of the respective location (i.e., a viewpoint) are determined in accordance with the location on the map that corresponds to a location of touch gesture 505 on touch screen 112. For example, the longitude and the latitude of the location on the map that corresponds to the location of touch gesture 505 on touch screen 112 are used as the longitude and the latitude of the viewpoint for user interface 502-4. In some embodiments, the altitude of the viewpoint is determined to be a predefined altitude (e.g., a predefined distance above sea level or a predefined distance above the ground). In some embodiments, the orientation of the view shown in FIG. 5D is determined in accordance with the longitude, latitude, and height of the target map object (e.g., building 504) and the longitude, latitude, and altitude of the viewpoint are such that building 504 is positioned at or near the central region of user interface 502-4.

Figure 5E:
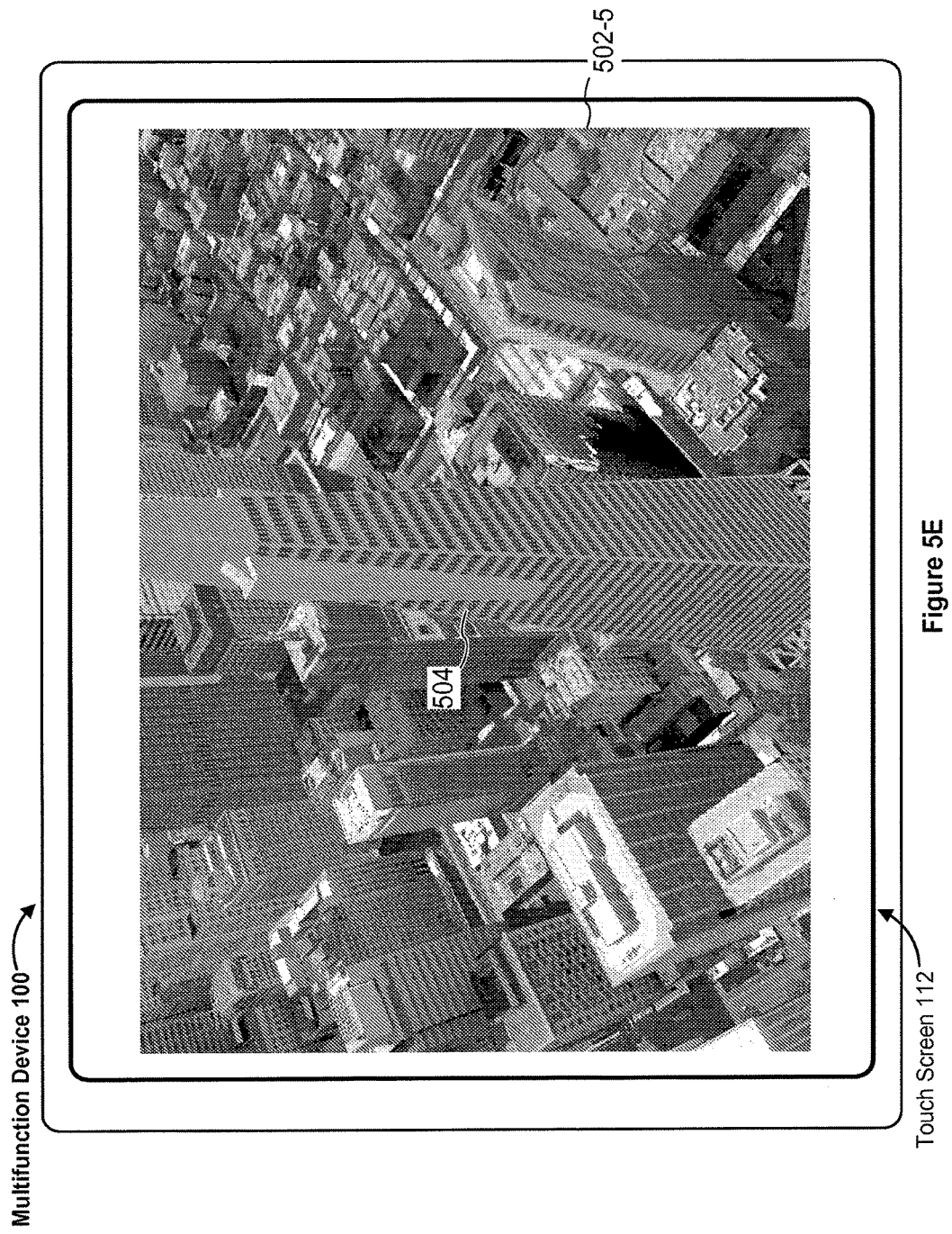

User interface 502-5 shown in FIG. 5E is an exemplary user interface displayed in response to detecting touch gesture 507 (FIG. 5C) on touch screen 112. User interface 502-5 shows a view of building 504 from a respective location that corresponds to touch gesture 507 (FIG. 5C). In some embodiments, the longitude and the latitude of the respective location (i.e., a viewpoint) are determined in accordance with the location on the map that corresponds to a location of touch gesture 507 on touch screen 112. For example, the longitude and the latitude of the location on the map that corresponds to the location of touch gesture 507 on touch screen 112 are used as the longitude and the latitude of the viewpoint for user interface 502-5. In some embodiments, the altitude of the viewpoint is determined in accordance with a height of the target map object (e.g., the altitude of the viewpoint is the height of building 504). In some embodiments, the orientation of the view shown in FIG. 5E is determined in accordance with the longitude, latitude, and height of the target map object (e.g., building 504) and the longitude, latitude, and altitude of the viewpoint are such that building 504 is positioned at or near the central region of user interface 502-5.

Figure 5F:
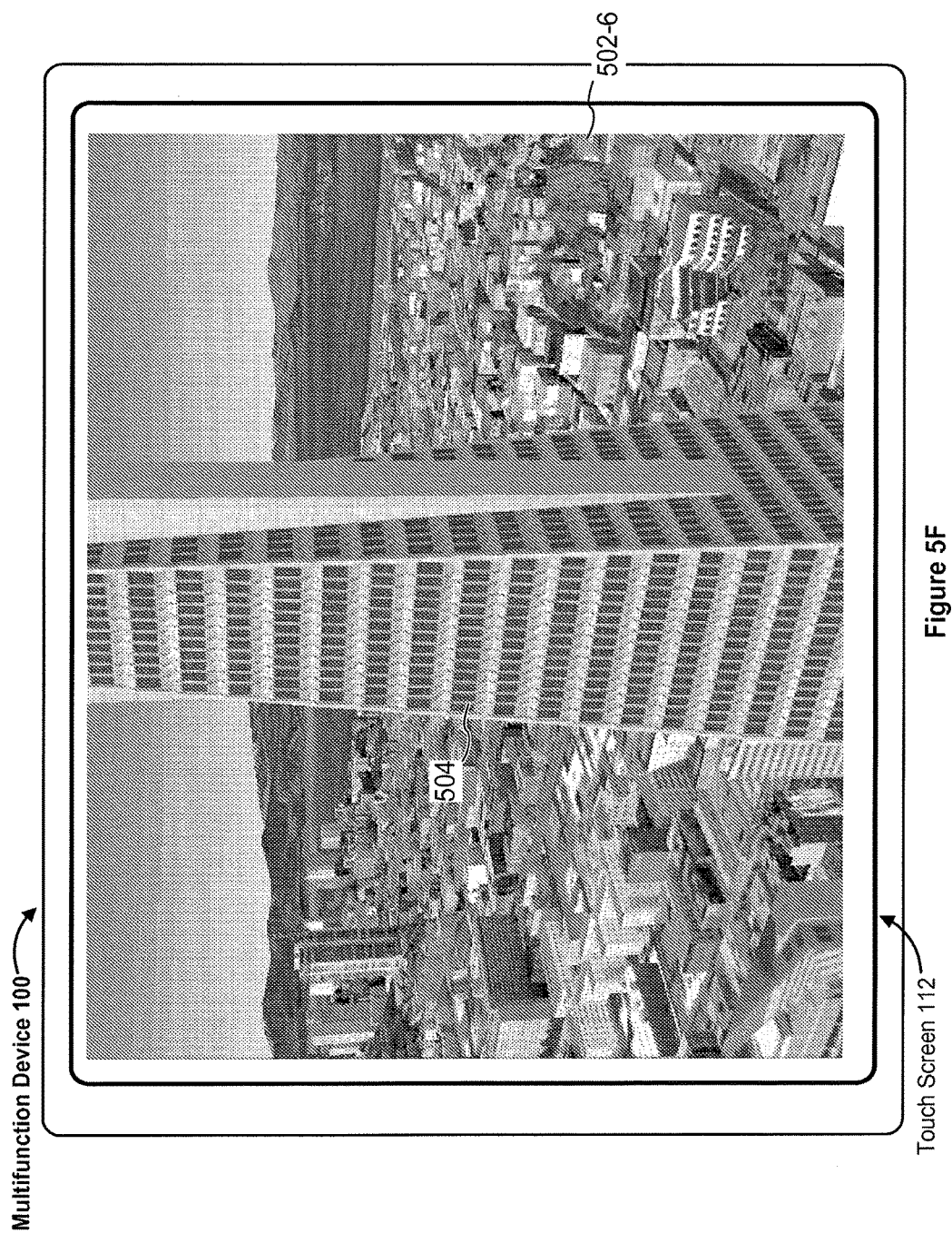

FIG. 5F illustrates exemplary user interface 502-6 displayed in response to detecting touch gesture 509 (FIG. 5C) on touch screen 112. User interface 502-6 shows a view of building 504 from a respective location that corresponds to touch gesture 509 (FIG. 5C). In some embodiments, the longitude and the latitude of the respective location (i.e., a viewpoint) are determined in accordance with the location on the map that corresponds to a location of touch gesture 509 on touch screen 112. For example, the longitude and the latitude of the location on the map that corresponds to the location of touch gesture 509 on touch screen 112 are used as the longitude and the latitude of the viewpoint for user interface 502-6. In some embodiments, the altitude of the viewpoint is determined in accordance with a height of a map object on the map that corresponds to the location of touch gesture 509 on touch screen 112 (e.g., the altitude of the viewpoint is the height of building 506). In some embodiments, the orientation of the view shown in FIG. 5F is determined in accordance with the longitude, latitude, and height of the target map object (e.g., building 504) and the longitude, latitude, and altitude of the viewpoint are such that building 504 is positioned at or near the central region of user interface 502-6.

Figure 5G:
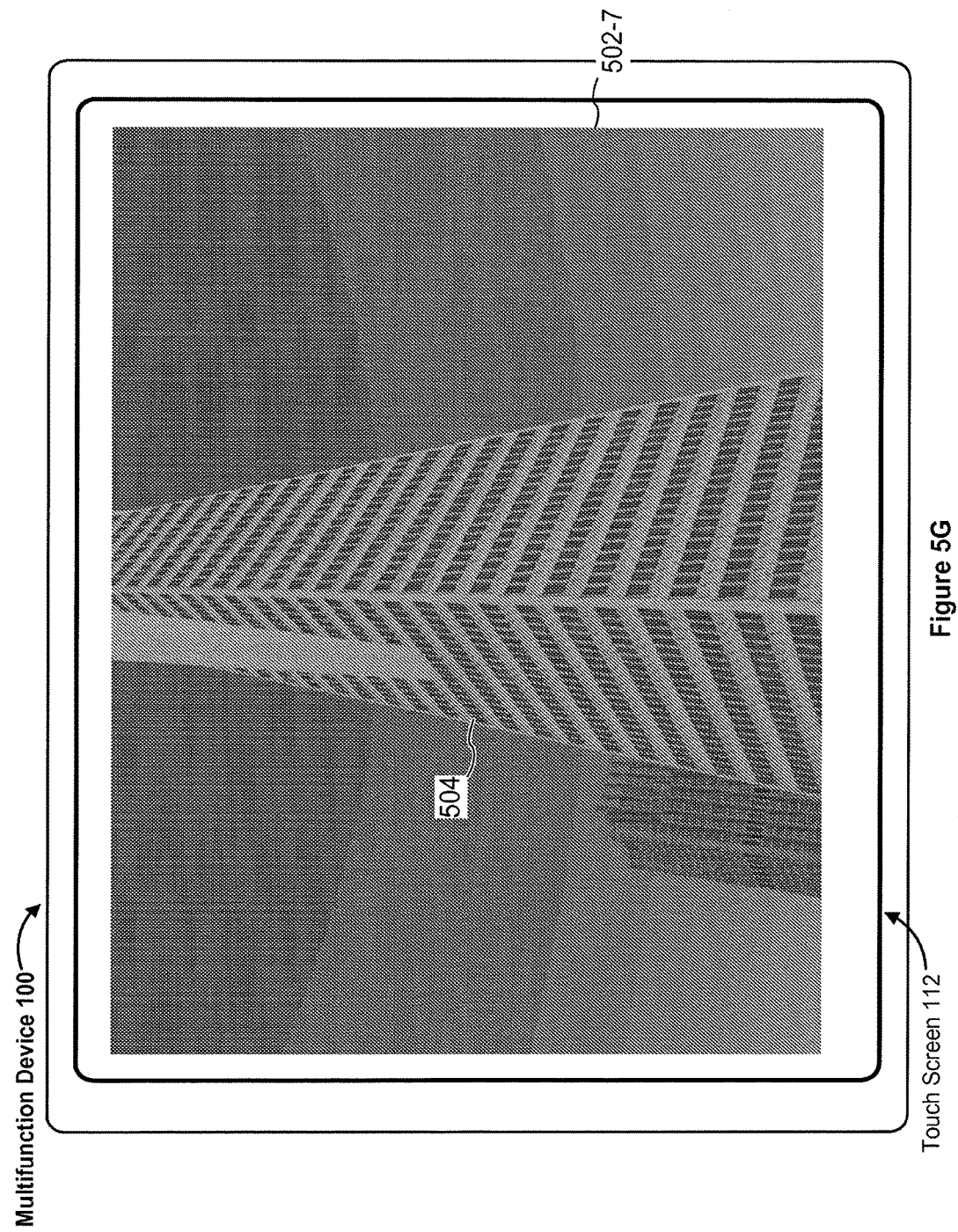

User interface 502-7 illustrated in FIG. 5G is an exemplary user interface that may be displayed in response to detecting touch gesture 511 (FIG. 5C) on touch screen 112. User interface 502-7 illustrates a view of building 504 from a respective location that corresponds to touch gesture 511 on touch screen 112 (FIG. 5C). In some embodiments, the longitude and the latitude of the respective location (i.e., a viewpoint) are determined in accordance with the location on the map that corresponds to a location of touch gesture 511 on touch screen 112. For example, the longitude and the latitude of the location on the map that corresponds to the location of touch gesture 511 on touch screen 112 are used as the longitude and the latitude of the viewpoint for user interface 502-7. In some embodiments, the altitude of the viewpoint is determined in accordance with a height of the target map object (e.g., building 504). For example, the altitude of the viewpoint may be a fraction (e.g., 25%, 33%, 50%, 75%, etc.) of the height of the target map object. Alternatively, the altitude of the viewpoint may be determined by a predefined multiplier (e.g., 1.1, 1.2, 1.5, 2, etc.) and the height of the target map object (e.g., the altitude is a multiple of the predefined multiplier and the height of the target map object). In some embodiments, the orientation of the view shown in FIG. 5G is determined in accordance with the longitude, latitude, and height of the target map object (e.g., building 504) and the longitude, latitude, and altitude of the viewpoint so that a center of building 504 is positioned at or near the central region of user interface 502-7.

Figure 5H:
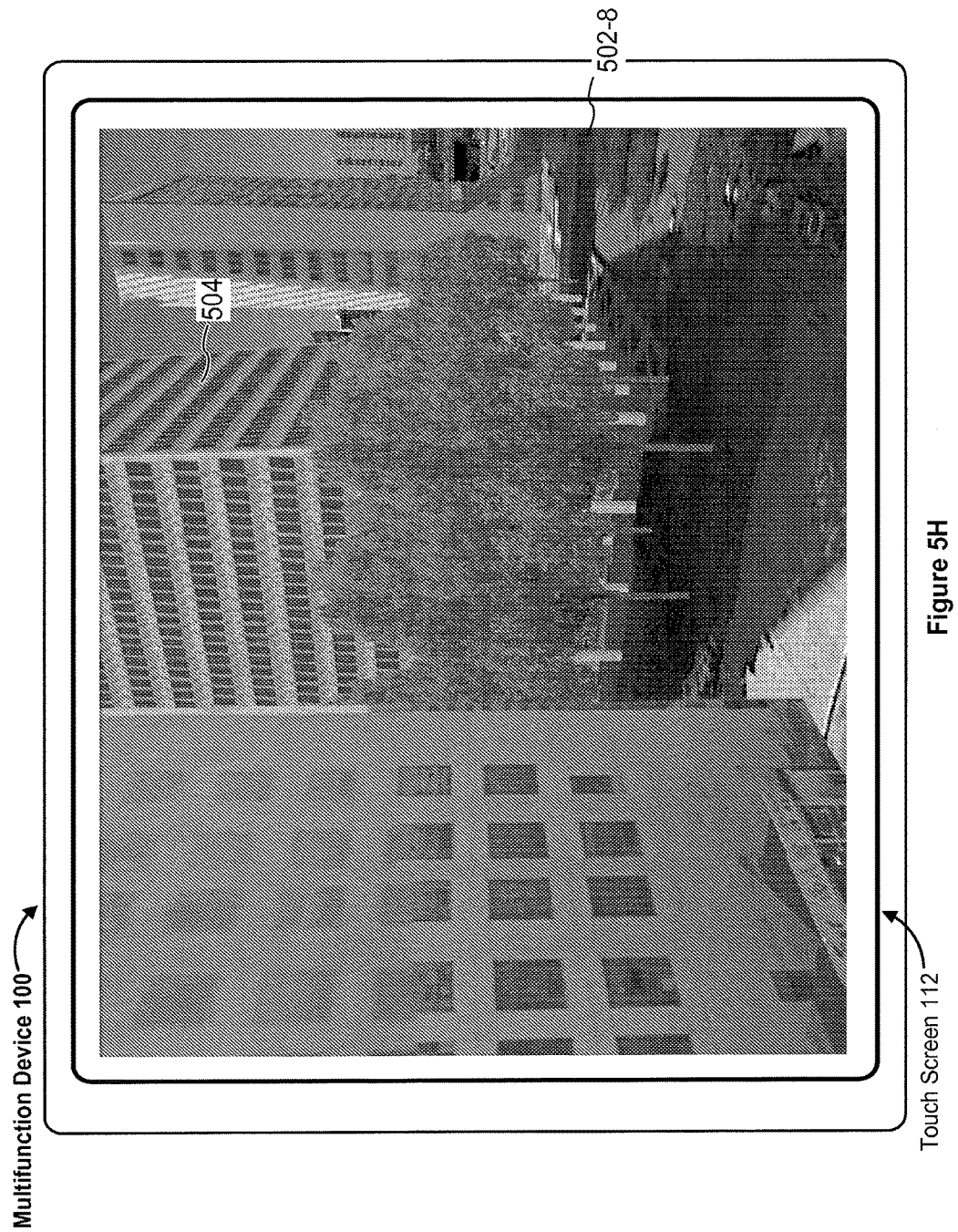

FIG. 5H illustrates alternative user interface 502-8 that may be displayed in response to detecting touch gestures 511 on touch screen 112 (FIG. 5C). User interface 502-8 shows a view of building 504 from a location that corresponds to touch gesture 511 on touch screen 112 (FIG. 5C). Similar to user interface 502-7 illustrated in FIG. 5F, the longitude and the latitude of the respective location (i.e., a viewpoint) for FIG. 5H are determined in accordance with the location on the map that corresponds to a location of touch gesture 511 on touch screen 112. For example, the longitude and the latitude of the location on the map that corresponds to the location of touch gesture 511 on touch screen 112 are used as the longitude and the latitude of the viewpoint for user interface 502-8. However, the distinction between user interface 502-7 (FIG. 5G) and user interface 502-8 (FIG. 5H) includes that, in FIG. 5H, the altitude of the viewpoint is determined in accordance with an altitude of a terrain (or a map object) on the map that corresponds to the location of touch gesture 511 on touch screen 112 (e.g., the altitude of the viewpoint is ground level when touch gesture 511 does not correspond to any map object, such as a building). In some embodiments, the orientation of the view shown in FIG. 5H is determined in accordance with the longitude and latitude of the target map object (e.g., building 504) and the longitude and latitude of the viewpoint are such that building 504 is positioned horizontally at or near the central region of user interface 502-8. In some embodiments, the pitch of the view shown in FIG. 5H is set to be zero so that the virtual viewer or camera does not look up or look down.

Figure 5I:
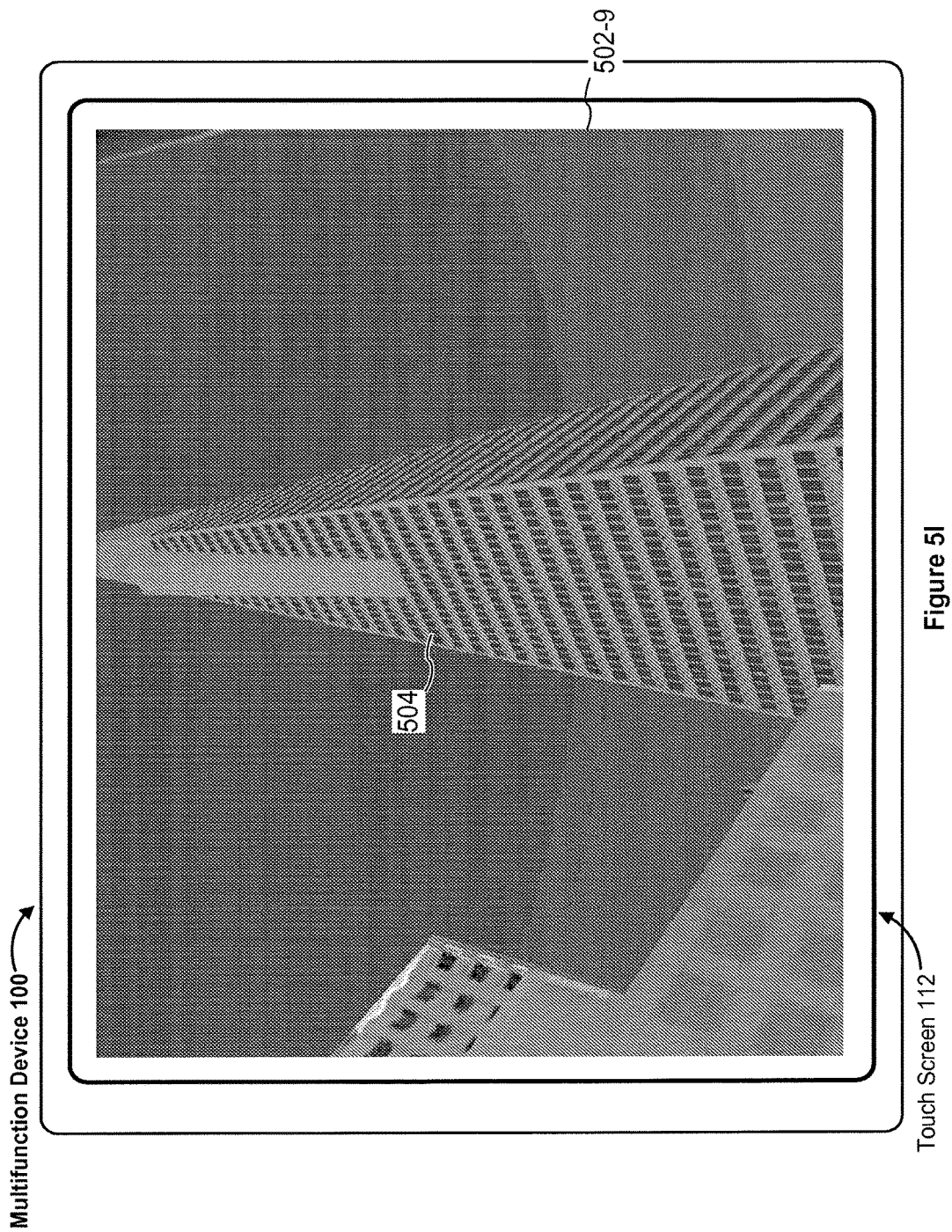

FIG. 5I illustrates alternative user interface 502-9 that may be displayed in response to detecting touch gestures 511 on touch screen 112 (FIG. 5C). User interface 502-9 shows a view of building 504 from a location that corresponds to touch gesture 511 on touch screen 112 (FIG. 5C). Similar to user interfaces 502-7 and 502-8 illustrated in FIGS. 5F and 5G, the longitude and the latitude of the respective location (i.e., a viewpoint) for FIG. 5I are determined in accordance with the location on the map that corresponds to a location of touch gesture 511 on touch screen 112. For example, the longitude and the latitude of the location on the map that corresponds to the location of touch gesture 511 on touch screen 112 are used as the longitude and the latitude of the viewpoint for user interface 502-9. In some embodiments, as with user interface 502-8, the altitude of the viewpoint is determined in accordance with an altitude of a terrain (or a map object) on the map that corresponds to the location of touch gesture 511 on touch screen 112 (e.g., the altitude of the viewpoint is the ground level when touch gesture 511 does not correspond to any map object, such as a building). In some embodiments, the orientation of the view shown in FIG. 5I is determined in accordance with the longitude, latitude, and height of the target map object (e.g., building 504) and the longitude, latitude, and altitude of the viewpoint so that a center of building 504 is positioned at or near the central region of user interface 502-9.

FIGS. 6A-6B are flow diagrams illustrating method 600 of selecting a view in a three-dimensional map in accordance with some embodiments. Method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 provides a simple, efficient way to select a view in a three-dimensional map. The method reduces the cognitive burden on a user when selecting a view in a three-dimensional map, thereby creating a more efficient human-machine interface. For battery-operated electronic devices, enabling a user to select views in a three-dimensional map faster and more efficiently conserves power and increases the time between battery charges.

The device displays (602) on the touch-sensitive display a first map view of a map that includes one or more map objects. For example, FIG. 5C illustrates a map view that includes a plurality of buildings, including building 504 and building 506.

In some embodiments, the map is (604) a three-dimensional map. For example, the map illustrated in FIG. 5C is a three-dimensional map that shows map objects (e.g., buildings) as three-dimensional structures. In some cases, a user can see one or more sides of certain buildings in the three-dimensional map, as shown in FIG. 5C.

In some embodiments, the one or more map objects include (606) one or more buildings (e.g., buildings 504 and 506, FIG. 5C).

In some embodiments, the electronic device detects (608) a third gesture of a second gesture type (e.g., single-finger double tap gesture 501, FIG. 5A) on the touch-sensitive display prior to detecting a first gesture of a first gesture type (e.g., single-finger single tap gesture 503, FIG. 5B). In response to detecting the third gesture of the second gesture type prior to detecting the first gesture of the first gesture type, the electronic device performs a predefined operation distinct from replacing the first view map with a second map view. In some embodiments, the predefined operation includes a zoom-in operation. For example, in response to touch gesture 501 in FIG. 5A, a zoomed-in view of the map is displayed in FIG. 5B. In other words, when the device is not in a map view selection mode (described below with respect to operation 612), a gesture of the second gesture type (e.g., a single-finger double tap gesture) initiates a predefined operation distinct from replacing the first map view with the second map view, whereas a gesture of the second gesture type, when detected while the device is in the map view selection mode, initiates replacing the first map view with the second map view.

While displaying the first map view, the electronic device detects (610) a first gesture of the first gesture type (e.g., a single-finger single tap gesture, a multi-finger single tap gesture, a single-finger multi-tap gesture, a multi-finger multi-tap gesture, a tap-and-hold gesture, etc.) at a first location on the touch-sensitive display, the first location corresponding to a respective map object of the one or more map objects. For example, in FIG. 5B, the electronic device detects touch gesture 503 at a location on touch screen 112 that corresponds to building 504 on the map.

In response to detecting the first gesture of the first gesture type at the first location on the touch-sensitive display, the electronic device enters (612) a map view selection mode.

While in the map view selection mode, the electronic device detects (614) the second gesture of the second gesture type at a second location on the touch-sensitive display distinct from the first location, the second location corresponding to a respective location on the map. For example, in FIG. 5C, the electronic device detects a touch gesture selected from touch gestures 505, 507, 509, and 511. As described with respect to FIG. 5C, touch gestures 505, 507, 509, and 511 are of a type distinct from the type of touch gesture 503 in FIG. 5B. For example, touch gesture 505 may be a double tap gesture and touch gesture 503 may be a single tap gesture. Alternatively, touch gesture 505 may be a single tap gesture and touch gesture 503 may be a double tap gesture. In yet another example, touch gesture 505 may be a one-finger tap gesture and touch gesture 503 may be a two-finger tap gesture.

In some embodiments, the first gesture type corresponds (616) to a single tap gesture and the second gesture type corresponds to a double tap gesture (e.g., touch gesture 503 in FIG. 5B is a single tap gesture, and each of touch gestures 505, 507, 509, and 511 in FIG. 5C is a double tap gesture).

In some embodiments, the respective location is (618) represented by a longitude, a latitude, and an altitude. The longitude and the latitude are determined in accordance with the second location on the touch-sensitive display, and the altitude is determined in accordance with an altitude of a terrain on the three-dimensional map that corresponds to the longitude and the latitude. For example, in response to detecting touch gesture 511 (FIG. 5C) at a location that corresponds to a street on the map, the altitude of the respective location is determined in accordance with the altitude of the street at the location that corresponds to touch gesture 511. FIGS. 5H and 5I illustrate that, in response to detecting touch gesture 511, the altitude of the respective location (e.g., a viewpoint) is determined to be at a ground level. In another example, in response to detecting touch gesture 509 at a location that corresponds to building 506 (FIG. 5C), the altitude of the respective location is determined in accordance with the height of building 506, as shown in FIG. 5F. FIG. 5F shows a view of building 504 seen from the top of building 506.

In some embodiments, the altitude is (620) determined to be a predefined altitude when the altitude of the terrain that corresponds to the longitude and the latitude is below the predefined altitude. For example, when the altitude of the terrain that corresponds to the longitude and the latitude is too low, a predefined minimum altitude is used. In some embodiments, the altitude is determined to be a second predefined altitude when the altitude of the terrain that corresponds to the longitude and the latitude is above the second predefined altitude. For example, when the altitude of the terrain that corresponds to the longitude and the latitude is too high, a predefined maximum altitude is used. In some embodiments, the altitude is determined to be a predefined altitude regardless of the altitude of the terrain that corresponds to the longitude and the latitude. For example, FIG. 5D illustrates a view of building 504 from a respective location that corresponds to touch gesture 505, where the altitude of the respective location is determined to be a predefined altitude.

In some embodiments, the respective map location is (622) represented by a longitude, a latitude, and an altitude. The longitude and the latitude are determined in accordance with the second location on the touch-sensitive display, and the altitude is determined in accordance with a height of the respective map object. For example, in response to detecting touch gesture 507 (FIG. 5C), the altitude of the respective location is determined in accordance with the height of building 504, as shown in FIG. 5E. In another example, in response to detecting touch gesture 511 (FIG. 5C), the altitude of the respective location is determined to be a fraction of the height of building 504, as shown in FIG. 5G.

In response to detecting the second gesture at the second location on the touch-sensitive display, the electronic device replaces (624) the first map view with a second map view, wherein the second map view includes a view of the respective map object from the respective location on the map. For example, in response to detecting touch gesture 505 (FIG. 5C), user interface 502-4 illustrated in FIG. 5D is displayed. In response to detecting touch gesture 507 (FIG. 5C), user interface 502-5 illustrated in FIG. 5E is displayed. In response to detecting touch gesture 509 (FIG. 5C), user interface 502-6 illustrated in FIG. 5F is displayed. In response to detecting touch gesture 511 (FIG. 5C), one of user interface 502-7, 502-8, and 502-9 illustrated in FIGS. 5G, 5H, and 5I is displayed.

In some embodiments, in response to detecting the second gesture at the second location on the touch-sensitive display, the electronic device exits the map view selection mode.

In some other embodiments, in response to detecting the second gesture at the second location on the touch-sensitive display, the electronic device remains in the map view selection mode. For these embodiments, while in the map view selection mode and displaying the second map view, in response to detecting another gesture of the second gesture type at another location on the touch-sensitive display that corresponds to a second respective location on the map, the device replaces the second map view with a third map view, wherein the third map view includes a view of the respective map object from the second respective location on the map. In other words, while the device remains in the map view selection mode, each gesture of the second gesture type immediately results in display of a map view of the respective map object from a location on the map that corresponds to the location of the gesture of the second gesture type.

It should be understood that the particular order in which the operations in FIGS. 6A-6B have been described is merely exemplary and is not intended to indicate that the described order is the only order in which the operations could be performed. One of ordinary skill in the art would recognize various ways to reorder the operations described herein. For example, in some embodiments, the electronic device enters the map view selection mode in response to first detecting, while displaying the first map view, the second gesture of the second gesture type at the second location corresponding to a viewpoint (e.g., one of gestures 505, 507, 509, and 511, FIG. 5C). Then, while in the map view selection mode, the electronic device detects the first gesture of the first gesture type at the first location corresponding to the respective map object (e.g., gesture 503, FIG. 5B), and replaces the first map view with a view of the respective map object seen from the viewpoint.

Figure 7:
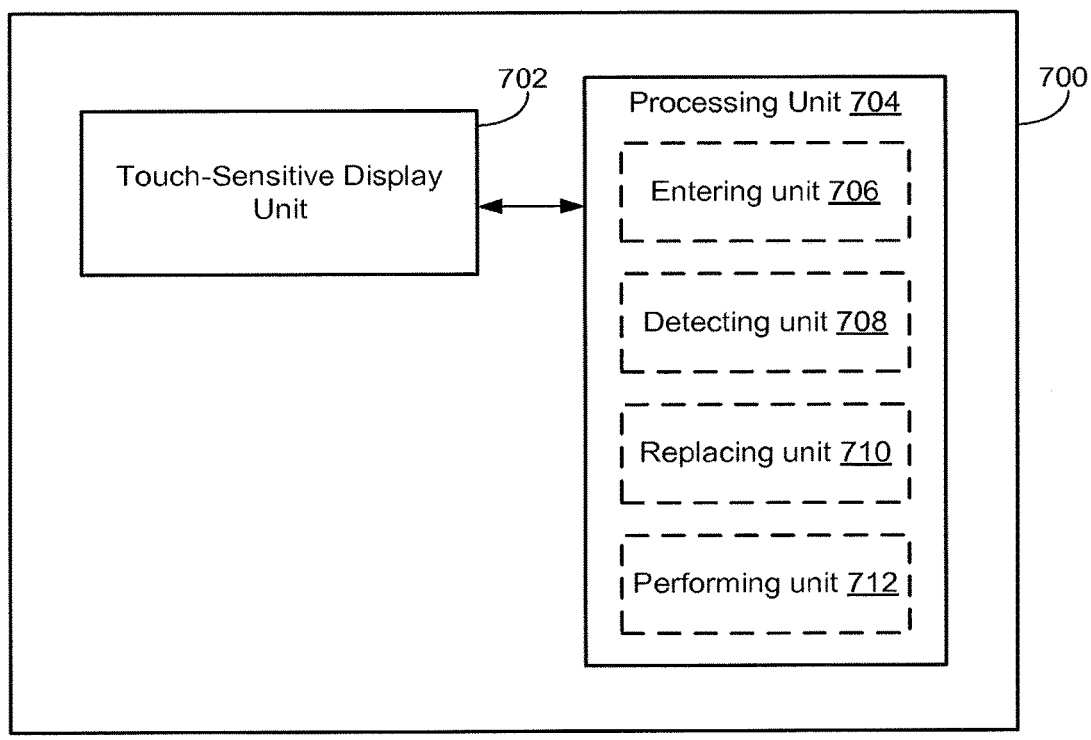
FIG. 7 is a functional block diagram of an electronic device in accordance with some embodiments.

In accordance with some embodiments, FIG. 7 shows a functional block diagram of electronic device 700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 7 may be combined or separated into sub-blocks to implement the principles of the invention as described above. Therefore, the description herein may support any possible combination or separation or further definition of the functional blocks described herein.

As shown in FIG. 7, electronic device 700 includes touch-sensitive display unit 702 configured to display a first map view of a map that includes one or more map objects, and, while displaying the first map view, receive a first gesture of a first gesture type at a first location on the touch-sensitive display unit, wherein the first location corresponds to a respective map object of the one or more map objects. Electronic device 700 also includes processing unit 704 coupled to touch-sensitive display unit 702.

In some embodiments, processing unit 704 includes entering unit 706, detecting unit 708, replacing unit 710, and performing unit 712.

Processing unit 704 is configured to, in response to detecting the first gesture of the first gesture type at the first location on touch-sensitive display unit 702, enter a map view selection mode (e.g., with entering unit 706). Processing unit 704 is also configured to, while in the map view selection mode, detect a second gesture of a second gesture type at a second location on touch-sensitive display unit 702 distinct from the first location (e.g., with detecting unit 708), wherein the second location corresponds to a respective location on the map. Processing unit 704 is further configured to, in response to detecting the second gesture at the second location on touch-sensitive display unit 702, replace the first map view with a second map view (e.g., with replacing unit 710), wherein the second map view includes a view of the respective map object from the respective location on the map.

In some embodiments, the map is a three-dimensional map.

In some embodiments, processing unit 704 is configured to detect a third gesture of the second gesture type on touch-sensitive display unit 702 prior to detecting the first gesture of the first gesture type (e.g., with detecting unit 708). Processing unit 704 is also configured to, in response to detecting the third gesture, perform a predefined operation distinct from replacing the first map view with the second map view (e.g., with performing unit 712).

In some embodiments, the first gesture type corresponds to a single tap gesture and the second gesture type corresponds to a double tap gesture.

In some embodiments, the one or more map objects include one or more buildings.

In some embodiments, the respective location is represented by a longitude, a latitude, and an altitude. The longitude and the latitude are determined (e.g., with processing unit 704) in accordance with the second location on the touch-sensitive display unit, and the altitude is determined (e.g., with processing unit 704) in accordance with an altitude of a terrain on the three-dimensional map that corresponds to the longitude and the latitude.

In some embodiments, the altitude is determined to be a predefined altitude (e.g., with processing unit 704) when the altitude of the terrain that corresponds to the longitude and the latitude is below the predefined altitude.

In some embodiments, the respective location is represented by a longitude, a latitude, and an altitude. The longitude and the latitude are determined (e.g., with processing unit 704) in accordance with the second location on the touch-sensitive display unit, and the altitude is determined (e.g., with processing unit 704) in accordance with a height of the respective map object.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6B may be implemented by components depicted in FIGS. 1A-1B. For example, detection operation 610, map view selection mode entering operation 612, and replacing operation 624 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a touch-sensitive surface;
a display;
one or more processors; and
memory storing one or more programs, wherein the one or more programs are configured to be executed by the one or more processors, the one or more programs including instructions for:
    displaying on the display a first map view of a map that includes one or more map objects, wherein the first map view is a view from a first perspective;
    while displaying the first map view:
        detecting a first input corresponding to an instruction to select a respective map object of the one or more map objects; and
        in response to detecting the first input, selecting the respective map object as a target object;
    while the respective map object is selected as the target object and is displayed from the first perspective, detecting a second input corresponding to an instruction to display a second map view; and
    in response to detecting the second input, replacing the first map view with a second map view of the map, wherein the second map view is selected so as to include a view of the target object from a second perspective that is different from the first perspective.

2. The device of claim 1, wherein:
the first perspective has a first elevation angle, and
the second perspective has a second elevation angle that is different from the first elevation angle.

3. The device of claim 1, wherein:
the first map view is a view of the map from a first viewpoint location; and
the second map view is a view of the map from a second viewpoint location.

4. The device of claim 2, wherein the first elevation angle is a substantially overhead angle.

5. The device of claim 2, wherein the second elevation angle is a substantially horizontal angle.

6. The device of claim 1, wherein:
the first map view is a view from a first altitude; and
the second map view is a view from a second altitude, the second altitude being less than the first altitude.

7. The device of claim 3, wherein:
the second input comprises a touch input detected at a location corresponding to a first location on the map; and
the second viewpoint location is determined in accordance with the first location.

8. The device of claim 6, wherein the second altitude is determined in accordance with a predefined altitude.

9. The device of claim 6, wherein the second altitude is determined in accordance with a height of the target object.

10. The device of claim 6, wherein the second altitude is determined in accordance with an altitude corresponding to a second viewpoint location.

11. The device of claim 2, wherein the second elevation angle is determined such that the target object is substantially centered in the second map view.

12. The device of claim 2, wherein the first elevation angle is determined in accordance with a predetermined angle.

13. The device of claim 3, wherein the second viewpoint location is determined in accordance with a predetermined location.

14. The device of claim 1, wherein the one or more map objects includes one or more buildings.

15. The device of claim 1, wherein the target object is a building.

16. The device of claim 1, wherein the map is a three-dimensional map.

17. The device of claim 1, wherein the second map view displays the target object in a central location on the display.

18. A computer-implemented method, comprising:
at an electronic device with a touch-sensitive surface and a display:
displaying on the display a first map view of a map that includes one or more map objects, wherein the first map view is a view from a first perspective;
while displaying the first map view:
detecting a first input corresponding to an instruction to select a respective map object of the one or more map objects; and
in response to detecting the first input, selecting the respective map object as a target object;
while the respective map object is selected as the target object and is displayed from the first perspective, detecting a second input corresponding to an instruction to display a second map view; and
in response to detecting the second input, replacing the first map view with a second map view of the map, wherein the second map view is selected so as to include a view of the target object from a second perspective that is different from the first perspective.

19. A non-transitory computer-readable medium having stored thereon instructions which, when executed by a device with a touch-sensitive surface and a display, cause the device to:
display on the display a first map view of a map that includes one or more map objects, wherein the first map view is a view from a first perspective;
while displaying the first map view:
detect a first input corresponding to an instruction to select a respective map object of the one or more map objects; and
in response to detecting the first input, select the respective map object as a target object;
while the respective map object is selected as the target object and is displayed from the first perspective, detect a second input corresponding to an instruction to display a second map view; and
in response to detecting the second input, replace the first map view with a second map view of the map, wherein the second map view is selected so as to include a view of the target object from a second perspective that is different from the first perspective.

20. The computer-readable medium of claim 19, wherein:
the first perspective has a first elevation angle, and
the second perspective has a second elevation angle that is different from the first elevation angle.

21. The computer-readable medium of claim 19, wherein:
the first map view is a view of the map from a first viewpoint location; and
the second map view is a view of the map from a second viewpoint location.

22. The computer-readable medium of claim 20, wherein the first elevation angle is a substantially overhead angle.

23. The computer-readable medium of claim 20, wherein the second elevation angle is a substantially horizontal angle.

24. The computer-readable medium of claim 19, wherein:
the first map view is a view from a first altitude; and
the second map view is a view from a second altitude, the second altitude being less than the first altitude.

25. The computer-readable medium of claim 21, wherein:
the second input comprises a touch input detected at a location corresponding to a first location on the map; and
the second viewpoint location is determined in accordance with the first location.

26. The computer-readable medium of claim 24, wherein the second altitude is determined in accordance with a predefined altitude.

27. The computer-readable medium of claim 24, wherein the second altitude is determined in accordance with a height of the target object.

28. The computer-readable medium of claim 24, wherein the second altitude is determined in accordance with an altitude corresponding to a second viewpoint location.

29. The computer-readable medium of claim 20, wherein the second elevation angle is determined such that the target object is substantially centered in the second map view.

30. The computer-readable medium of claim 20, wherein the first elevation angle is determined in accordance with a predetermined angle.

31. The computer-readable medium of claim 21, wherein the second viewpoint location is determined in accordance with a predetermined location.

32. The computer-readable medium of claim 19, wherein the one or more map objects includes one or more buildings.

33. The computer-readable medium of claim 19, wherein the target object is a building.

34. The computer-readable medium of claim 19, wherein the map is a three-dimensional map.

35. The computer-readable medium of claim 19, wherein the second map view displays the target object in a central location on the display.

36. The method of claim 18, wherein:
the first perspective has a first elevation angle, and
the second perspective has a second elevation angle that is different from the first elevation angle.

37. The method of claim 18, wherein:
the first map view is a view of the map from a first viewpoint location; and
the second map view is a view of the map from a second viewpoint location.

38. The method of claim 36, wherein the first elevation angle is a substantially overhead angle.

39. The method of claim 36, wherein the second elevation angle is a substantially horizontal angle.

40. The method of claim 18, wherein:
the first map view is a view from a first altitude; and
the second map view is a view from a second altitude, the second altitude being less than the first altitude.

41. The method of claim 37, wherein:
the second input comprises a touch input detected at a location corresponding to a first location on the map; and
the second viewpoint location is determined in accordance with the first location.

42. The method of claim 40, wherein the second altitude is determined in accordance with a predefined altitude.

43. The method of claim 40, wherein the second altitude is determined in accordance with a height of the target object.

44. The method of claim 40, wherein the second altitude is determined in accordance with an altitude corresponding to a second viewpoint location.

45. The method of claim 36, wherein the second elevation angle is determined such that the target object is substantially centered in the second map view.

46. The method of claim 36, wherein the first elevation angle is determined in accordance with a predetermined angle.

47. The method of claim 37, wherein the second viewpoint location is determined in accordance with a predetermined location.

48. The method of claim 18, wherein the one or more map objects includes one or more buildings.

49. The method of claim 18, wherein the target object is a building.

50. The method of claim 18, wherein the map is a three-dimensional map.

51. The method of claim 18, wherein the second map view displays the target object in a central location on the display.

* * * * *